US007096230B2

(12) United States Patent
Kraft

(10) Patent No.: US 7,096,230 B2
(45) Date of Patent: Aug. 22, 2006

(54) COMPUTER-IMPLEMENTED METHOD AND SYSTEM TO SUPPORT IN DEVELOPING A PROCESS SPECIFICATION FOR A COLLABORATIVE PROCESS

(75) Inventor: Frank Michael Kraft, Speyer (DE)

(73) Assignee: SAP Aktiengesellschaft, (DE)

( * ) Notice: Subject to any disclaimer, the term of this patent is extended or adjusted under 35 U.S.C. 154(b) by 477 days.

(21) Appl. No.: 10/631,324

(22) Filed: Aug. 1, 2003

(65) Prior Publication Data

US 2005/0027738 A1 Feb. 3, 2005

(51) Int. Cl.
*G06F 17/30* (2006.01)
(52) U.S. Cl. ........................ 707/102; 707/10; 709/203; 709/207
(58) Field of Classification Search ................. 707/10, 707/102; 709/203, 206, 207
See application file for complete search history.

(56) References Cited

U.S. PATENT DOCUMENTS

| | | | | |
|---|---|---|---|---|
| 4,694,422 | A | 9/1987 | Kakuda et al. | 714/49 |
| 4,777,595 | A | 10/1988 | Strecker et al. | 709/236 |
| 5,655,075 | A | 8/1997 | Saito et al. | 714/48 |
| 5,842,216 | A | 11/1998 | Anderson et al. | 707/253 |
| 5,864,837 | A | 1/1999 | Maimone et al. | 707/1 |
| 5,974,129 | A | 10/1999 | Bodnar | 379/220.01 |
| 6,212,653 | B1 | 4/2001 | Boivin et al. | 714/45 |
| 6,310,941 | B1 * | 10/2001 | Crutcher et al. | 379/88.17 |
| 6,332,155 | B1 * | 12/2001 | Notani | 709/205 |
| 6,415,315 | B1 | 7/2002 | Glass | 709/201 |
| 6,442,586 | B1 | 8/2002 | Glass | 709/202 |
| 6,529,932 | B1 | 3/2003 | Dadiomov et al. | 718/101 |
| 6,557,027 | B1 * | 4/2003 | Cragun | 709/204 |
| 6,564,218 | B1 | 5/2003 | Roth | 707/10 |
| 6,631,386 | B1 | 10/2003 | Arun et al. | 707/203 |
| 6,738,797 | B1 | 5/2004 | Martin | 709/201 |
| 6,754,657 | B1 | 6/2004 | Lomet | 707/8 |
| 6,761,636 | B1 | 7/2004 | Chung et al. | 463/42 |
| 6,766,321 | B1 * | 7/2004 | Sasaki et al. | 707/8 |
| 6,836,891 | B1 * | 12/2004 | Okada et al. | 719/313 |
| 6,941,304 | B1 * | 9/2005 | Gainey et al. | 707/10 |
| 6,944,611 | B1 * | 9/2005 | Flank et al. | 707/3 |
| 6,952,660 | B1 | 10/2005 | Matheson | 703/1 |

FOREIGN PATENT DOCUMENTS

| | | | |
|---|---|---|---|
| EP | 0 684 720 | A | 11/1995 |
| EP | 0 926 608 | A | 6/1999 |

OTHER PUBLICATIONS

Bosik, B.S., et al., "Finite State Machine Based Formal Methods in Protocol Conformance Testing: From Theory to Implementation," *Computer Networks and ISDN Systems*, North Holland Publishing, Amsterdam, NL, vol. 22, No. 1, Aug. 1, 1991, pp. 7-33, XP00224436.

(Continued)

Primary Examiner—Greta Robinson
Assistant Examiner—Cheryl Lewis
(74) *Attorney, Agent, or Firm*—Fish & Richardson P.C.

(57) ABSTRACT

A computer-implemented method or computer system develops a process specification for a collaborative process involving distributed computer-based participant systems exchanging messages through an asynchronous messaging network. In operation, a computer retrieves, from a first computer system, information on process states and process state transitions in relation to each participant system. Information on collaboration states and collaboration state transitions of the process are stored in a second computer system and used to generate information on dead-end collaboration states.

13 Claims, 12 Drawing Sheets

OTHER PUBLICATIONS

"Application Link Enabling," http://searchsap.techtarget.com/sDefinition/0,,sid21_gci822148,00.html, May 7, 2002, printed from the Internet Dec. 10, 2003, 2 pgs.

'Half.com: Apple iPod Mini—Questions & Answers' [online]. half.com by ebay, undated materials, [retrieved on Mar. 7, 2005]. Retrieved from the Internet: <URL: http://half.ebay.com/cat/buy/ask_question.cgi?offer_id=1286774759&meta_id=6&domain_id=447>.

'Half.com: Apple iPod Mini—Seller's Description' [online]. half.com by ebay, undated materials, [retrieved on Mar. 16, 2005]. Retrieved from the Internet: <URL: http://half.ebay.com/cat/buy/inv.cgi?offer_id=1286774759&meta_id=6&cpid=1202509734&domain_id=447>.

'The Next Evolution of E-Commerce—Tango Trade Press Release' [online]. Undated materials, [retrieved initially, in part, on Mar. 7, 2005, then again in its entirety on Apr. 28, 2005]. Retrieved from the Internet: <URL: http://www.p2p-zone.com/underground/showthread.php?s=&threadid=16211>. See, e.g., pp. 10-11.

'P2P Real Time Trading Community from Tango' [online]. Undated materials, [retrieved initially, in part, on Mar. 7, 2005; then again in its entirety on Apr. 28, 2005]. Retrieved from the Internet: <URL: http://www.collaborate.com/publication/newsletter/n10603.html#portal>. See, e.g., pp. 24-25.

Robinson, Scott, "Save Time and Effort with SAP's ALE Change Pointers," http://techrepublic.com.com/5102-6329-0148973.html, Aug. 12, 2002, copyright 1995-2003 CNET Networks, Inc., printed from the Internet Sep. 4, 2003, 3 pgs.

'TangoTrade.net—About' [online]. Tango, undated materials, [retrieved on Mar. 16, 2005]. Retrieved from the Internet: <URL: http://www.tangotrade.net/about.html>.

'Tango Trade 2.0: End-User Market for: EBAY P/N 370-2304' [online]. Tango, undated materials, [retrieved on Mar. 7, 2005]. Retrieved from the Internet: <URL: http://rook.tangotrade.net/live/bidask.php?Item=370-2304&ManuName=EBAY>.

'Tango Trade 2.0: Sell an Item' [online]. Tango, undated materials, [retrieved on Mar. 7, 2005]. Retrieved from the Internet: <URL: http://dns-1.wtic.net/sell.php?&PHPAUCTION_SESSION=9182eb870619298ff76e18a31b0a7635>.

'Welcome to TangoTrade.net' [online]. Tango, undated materials, [retrieved on Mar. 7, 2005]. Retrieved from the Internet: <URL: http://www.tangotrade.net/index.html>.

Haase, Kim, "Java Message Service API Tutorial," Sun Developer Network Site, Aug. 2001, retrieved from the Internet on Jan. 7, 2004, at http://java.sun.com/products/jms/docs.htm, XP002266306, 270 pgs.

Johnson, David B, et al., "Sender-Based Message Logging," 7th Symposium on Fault-Tolerant Computing, 1987, retrieved from the Internet on Jan. 8, 2004, at http://citeseer.nj.necessary.com/johnson87senderbased.html, XP002266307, 6 pgs.

Kakuda, Yoshiaki, et al., "Automated Verification of Responsive Protocols Modeled by Extended Finite State Machines," Real-Time Systems, Kluwer Academic Publishers, Dordrecht, NL, vol. 7, No. 3, Nov. 1, 1994, XP 000485229, pp. 275-289.

Yuang, Maria C., "Survey of Protocol Verification Techniques Based on Finite State Machine Models," Apr. 11, 1988, Proceedings of the IEEE NBS Computer Networking Symposium, Washington, DC, XP010011847, pp. 164-172.

"Analysis of Petri Net Performance Model," http://www.document.ic.ac.uk/~nd/surprise_95/journal/vol2/nr1/article2.html, printed from the Internet Sep. 5, 2003, 2 pgs.

Brink, Richard Scott, "A Petri Net Design, Simulation, and Verification Tool," Rochester Institute of Technology, Sep. 1996, http://www.csh.rit.edu/~rick/thesis/document/PetriThesis.html, printed from the Internet Sep. 5, 2003, 47 pgs.

Carryer, J. Edward, "State Machines," Feb. 2, 2001, http://design.stanford.edu/spdl/ee118/pdf_files/State Machines.pdf, printed from the Internet Sep. 5, 2003, 3 pgs.

"DotnetCoders—UML: Statechart Diagrams," copyright 2000-2003 .netCoders, http://www.dotnetcoders.com/web/learning/uml/diagrams/statechart.aspx, printed from the Internet Dec. 10, 2003, 2 pgs.

"Finite State Machine—A WhatIs Definition," http://whatis.techtarget.com/definition/0,,sid9_gci213052,00.html, printed from the Internet Dec. 10, 2003, 4 pgs.

"StateMachines," copyright 1996-2002 BoldSoft, copyright 2002 Borland, http://information.borland.com/techpubs/delphi/boldfordelphi/html/Mech_StateMachines.htm, printed from the Internet Sep. 5, 2003, 1 pg.

"UML Tutorial—State Diagrams," Kennesaw State University, http://pigseye.kennesaw.edu/~dbraun/csis/4650/A&D/UML_tutorial/state.htm, printed from the Internet Dec. 10, 2003, 4 pgs.

* cited by examiner

Fig. 8

| 0 | invalid | dead-end | complete | S2 | S3 | Mx: 1 | My: 1 | Mz: 1 |
| 1 | invalid | dead-end | complete | S2 | S3 | Mx: 1 | My: 1 | Mz: 0 |
| 2 | valid | live-end | complete | S2 | S3 | Mx: 1 | My: 0 | Mz: 1 |
| 3 | valid | live-end | complete | S2 | S3 | Mx: 1 | My: 0 | Mz: 0 |
| 4 | valid | live-end | complete | S2 | S3 | Mx: 0 | My: 1 | Mz: 1 |
| 5 | valid | live-end | complete | S2 | S3 | Mx: 0 | My: 1 | Mz: 0 |
| 6 | valid | dead-end | incomplete | S2 | S3 | Mx: 0 | My: 0 | Mz: 1 |

AO1  AO2  AO3

COMPUTER-IMPLEMENTED METHOD AND SYSTEM TO SUPPORT IN DEVELOPING A PROCESS SPECIFICATION FOR A COLLABORATIVE PROCESS

FIELD OF THE INVENTION

The present invention generally relates to the development of a specification for a collaborative process involving computer-based participant systems collaborating through exchange of messages over an asynchronous messaging network. More particularly, the present invention is concerned with developing a complete and consistent process specification.

BACKGROUND OF THE INVENTION

Asynchronous messaging is a widely used means of communication between loosely coupled participant systems engaged in a collaborative process such as, e.g., an electronic business process involving distributed business partners. Generally, a collaborative process is one that is characterized by a plurality (two or more) of participants collaborating through exchange of messages in order to accomplish an overall goal or result. Collaborative business processes can be conducted among participants within a single enterprise. They can also involve business partners from different enterprises. Electronic financial controlling/budgeting systems, electronic material resource planning/controlling systems, and electronic purchase/sales order systems are but examples of modern electronic business/commerce applications that may involve collaborative processes of distributed participants, or clients.

Generally, a participant system engaged in a computer-implemented collaborative process can be viewed as comprising the entirety of hardware and software components required to make up a full-fledged participant to the process. In a more specific perspective, a participant system is formed by a software system implemented and executed on a computer and providing one or more software applications capable of consuming and producing messages received from, and sent to, other participant systems. The participant system may include, or have access to, one or more databases allowing storage of various application-related data such as, e.g., financial figures, fabrication figures, stock figures, etc. The messages exchanged between the participant systems may, e.g., contain requests or reports specifying business actions. The exchange of the messages is asynchronous in that an application sending a message does not need to wait for a remote application to receive that message. Thus, there is no need for all elements of the infrastructure linking the participant systems to be available at all times.

A conventional way of specifying a collaborative process is using UML (Unified Modeling Language) state chart diagrams. A state chart diagram specifies states that can be assumed by a participant system or a sub-system thereof in the course of the collaborative process as well as state transitions of the participant system/sub-system. A sub-system of a participant system can, e.g., be a software object that forms part of a software application program. Software objects can, e.g., represent business objects in a business application. Each participant system of a collaborative process can comprise multiple software sub-systems each having unique sub-system states and sub-system state transitions. The term software sub-system as used herein is to be given the broadest and most general meaning. A software sub-system simply refers to a functional and/or logical and/or physical part or portion of the entirety of software that is present in a participant system. In particular, the term software sub-system as used herein expressly supports a concept in which the processing of data in two or more software sub-systems of the same participant system can be done, and the sub-systems' states can be updated, in one transaction.

Generally, a state transition is defined by a starting state, a target state, a triggering event and a resulting event. The starting state and the target state can be different, or be the same. In the first case, the participant system/sub-system experiences a transition from one state to another, in the second case, a transition-to-self. A triggering event can, e.g., be a message transmitted over the messaging network from another participant system. It can also be a local event unrelated to communication over the messaging network, e.g., a data input through a local user interface or by another local software application. A triggering event can even be a message that is outside the scope of the process analysis. From the sight of the process model, such external message can be triggered as unmotivated as any local event due to, e.g., user action or batch transaction. Similarly, a resulting event can include the sending of a message to another participant system and/or an event local to the respective participant system, e.g., an output of data for display on a monitor or storage in a database.

Optimally, a collaboration specification deals with every possible scenario of occurring messages, states, and state transitions of the software systems/sub-systems involved in the process. However, when developing a collaborative process it may easily happen that one or more potentially occurring scenarios are not considered and remain unspecified. If the collaboration process is implemented using a specification that is incomplete, such unspecified situations lead to errors in the collaboration. The user typically does not have a straight solution for this problem. This requires that a provider of customer support be informed, causing costs for maintenance. In some instances these costs can be small compared with losses in revenue or business that may result from the failure.

For humans it is a hard to achieve a fully consistent and complete collaboration specification. Only very experienced personnel will be capable of doing so. This is particularly true as the complexity of the collaboration specification grows dramatically with the number of messages that can be communicated. Even harder is it to achieve this goal of completeness of the process specification in a distributed team of developers, a case normal in today's world of software development. It is therefore highly desirable to provide a developer engaged in developing a specification for a collaborative process with a tool that supports him in achieving a complete and consistent process specification.

SUMMARY OF THE INVENTION

According to one aspect, the present invention provides a computer-implemented method to support in developing a process specification for a collaborative process involving distributed computer-based participant systems exchanging messages through an asynchronous messaging network, the method embodied by a computer program product executable by a computer system and causing, when executed, the computer system to carry out the steps of retrieving from a first storage location, sub-system state information on sub-system states and sub-system state transitions in relation to a plurality of software sub-systems of each participant system, the sub-system state information specifying in relation to each sub-system state transition, starting and target sub-system states of the corresponding software sub-system and events triggering, and resulting from, the respective sub-system state transition; processing the retrieved sub-system state information to generate, and store in a second storage location, collaboration state information on collaboration states and collaboration state transitions of the process, the collaboration states being defined by a sub-system state for each software sub-system of each participant system and a communication status of each message exchangeable between the participant systems, the collaboration state transitions being determined based on the sub-system state transitions; upon generation and storage of the collaboration state information, retrieving the collaboration state information from the second storage location; processing the retrieved collaboration state information to generate information on incompletely specified terminal collaboration states among the collaboration states, an incompletely specified terminal collaboration state being a terminal collaboration state in which at least one message is underway between the participant systems; and generating a result data object containing information on every incompletely specified terminal collaboration state found.

The method of the present invention detects any incompleteness present in the process specification, thus allowing a developer, who may be the single designer of the collaborative process, but may also be part of a distributed team, to eliminate inconsistencies in, and perfect, the process specification early in the design phase. This avoids errors that may occur in practice, which may entail considerable cost and time for rectification. The invention allows for a completion of test cases relevant to the process to be designed. More test cases can be considered and therefore less errors occur at the customer.

Processing the sub-system state information can include the steps of processing the sub-system state information to generate, and store in a third storage location, local state information on local states and local state transitions of each participant system, the local state information specifying in relation to each local state transition, starting and target local states of the corresponding participant system and events triggering, and resulting from, the respective local state transition, the local states being defined by a sub-system state for each software sub-system of the respective participant system, the local state transitions being defined by applying the sub-system state transitions to said local states; upon generation and storage of the local state information, retrieving the local state information from the third storage location; and processing the retrieved local state information to generate the collaboration state information, the collaboration state transitions being determined by applying the local state transitions to the collaboration states.

Processing the sub-system state information can further include identifying an initial sub-system state from the sub-system states of each software sub-system; and generating the local state information by determining an initial local state for each participant system from the initial sub-system states of the software sub-system of the respective participant system, determining subsequent local states by applying the sub-system state transitions to the initial local states, and reiterating applying the sub-system state transitions to local states identified in a previous iteration until no further local states are found.

In one embodiment, the step of processing the retrieved local state information can include generating, and storing in the second storage location, information on a set of virtual global states, the virtual global states being defined each by a local state for each participant system and a communication status of each message, the set of virtual global states comprising states of any combination of local states of the participant systems and communication statuses of the messages.

The virtual global states can be represented each by a global state vector composed of first global state vector elements indicating a local state for each participant system and one or more second global state vector elements, one in relation to each message, each second global state vector element indicating a communication status of the respective message, the set of virtual global states comprising states of any combination of values of the first and second global state vector elements.

Processing the retrieved local state information can include identifying an initial global state among the virtual global states, this initial global state being one in which at least one local state transition as specified by the local state information and involving a local trigger is applicable to the initial global state and no message is underway between the participant systems, the local state transition causing a global state transition from the initial global state to another virtual global state; determining every virtual global state reachable when starting from the initial global state; and determining the initial global state and every virtual global state reachable from the initial global state to be collaboration states.

According to an alternate embodiment, processing the retrieved local state information can include the step of generating the collaboration state information by: determining an initial collaboration state, the initial collaboration state being defined by an initial local state for each participant system and a non-presence communication status of each message; determining subsequent collaboration states by applying the local state transitions to the initial collaboration state; and reiterating applying the local state transitions to collaboration states identified in a previous iteration until no further collaboration states are found.

In another aspect, the present invention provides a computer-implemented method to support in developing a process specification for a collaborative process involving distributed computer-based participant systems exchanging messages through an asynchronous messaging network, the method embodied by a computer program product executable by a computer system and causing, when executed, the computer system to carry out the steps of: retrieving from a third storage location, local state information on local states and local state transitions in relation to each participant system, the local state information specifying in relation to each local state transition, starting and target local states of the corresponding participant system and events triggering, and resulting from, the respective local state transition; processing the retrieved local state information to generate, and store in a second storage location, information on collaboration states and collaboration state transitions of said process, the collaboration states defined by a local state for each participant system and a communication status of each message exchangeable between the participant systems, the step of processing the local state information including the steps of identifying an initial local state from the local states of each participant system and generating the collaboration state information by: determining an initial collaboration state, the initial collaboration state being defined by the initial local state of each participant system and a non-presence communication status of each message; determining subsequent collaboration states by applying the local state transitions to the initial collaboration state; and reiterating applying the local state transitions to collaboration states identified in a previous iteration until no further collaboration states are found; upon generation and storage of said collaboration state information, retrieving the collaboration state information from the second storage location; processing the retrieved collaboration state information to generate information on incompletely specified terminal collaboration states among the collaboration states, an incompletely specified terminal collaboration state being a terminal collaboration state in which at least one message is underway between the participant systems; and generating a result data object containing information on every incompletely specified terminal collaboration state found.

The result data object can be stored in a fourth storage location. The first, second, third, and fourth storage locations as used herein refer to any of a database, a file, a register or set of registers, a memory, a cache, etc that allow to permanently or temporarily store information.

The result data object can be forwarded to a graphical output device to visually present on a display a presentation object indicating every incompletely specified terminal collaboration state found. Presenting the presentation object may include presenting a result list enumerating every collaboration state. The result list may contain in relation to each collaboration state one or more annotation objects indicating, e.g., whether or not the respective collaboration state is an incompletely specified terminal collaboration state.

The communication status is preferably a binary status indicating whether or not the respective message is underway between said participant systems.

According to yet another aspect of the present invention, a computer system is provided to support in developing a process specification for a collaborative process involving distributed computer-based participant systems exchanging messages through an asynchronous messaging network, the computer system provided with a computer program product that, when executed, causes the computer system to carry out the steps of retrieving from a first storage location, sub-system state information on sub-system states and sub-system state transitions in relation to a plurality of software sub-systems of each participant system, the sub-system state information specifying in relation to each sub-system state transition, starting and target sub-system states of the corresponding software sub-system and events triggering, and resulting from, the respective sub-system state transition; processing the retrieved sub-system state information to generate, and store in a second storage location, collaboration state information on collaboration states and collaboration state transitions of the process, the collaboration states being defined by a sub-system state for each software sub-system of each participant system and a communication status of each message exchangeable between the participant systems, the collaboration state transitions being determined based on the sub-system state transitions; upon generation and storage of the collaboration state information, retrieving the collaboration state information from the second storage location; processing the retrieved collaboration state information to generate information on incompletely specified terminal collaboration states among the collaboration states, an incompletely specified terminal collaboration state being a terminal collaboration state in which at least one message is underway between the participant systems; and generating a result data object containing information on every incompletely specified terminal collaboration state found.

Still another aspect of the present invention provides a computer system to support in developing a process specification for a collaborative process involving distributed computer-based participant systems exchanging messages through an asynchronous messaging network, the computer system provided with a computer program product that, when executed, causes the computer system to carry out the steps of retrieving from a third storage location, local state information on local states and local state transitions in relation to each participant system, the local state information specifying in relation to each local state transition, starting and target local states of the corresponding participant system and events triggering, and resulting from, the respective local state transition; processing the retrieved local state information to generate, and store in a second storage location, information on collaboration states and collaboration state transitions of the process, the collaboration states defined by a local state for each participant system and a communication status of each message exchangeable between the participant systems, the step of processing the local state information including the steps of identifying an initial local state from the local states of each participant system and generating the collaboration state information by determining an initial collaboration state, the initial collaboration state being defined by the initial local state of each participant system and a non-presence communication status of each message; determining subsequent collaboration states by applying the local state transitions to the initial collaboration state; and reiterating applying the local state transitions to collaboration states identified in a previous iteration until no further collaboration states are found; upon generation and storage of the collaboration state information, retrieving the collaboration state information from the second storage location; processing the retrieved collaboration state information to generate information on incompletely specified terminal collaboration states among the collaboration states, an incompletely specified terminal collaboration state being a terminal collaboration state in which at least one message is underway between the participant systems; and generating a result data object containing information on every incompletely specified terminal collaboration state found.

BRIEF DESCRIPTION OF THE DRAWINGS

Hereinafter, the present invention is described in more detail in conjunction with the accompanying drawings in which:

FIG. 8 is an exemplary result object presented as a result of the collaboration checking procedure;

DETAILED DESCRIPTION OF THE DRAWINGS

Figure 1:
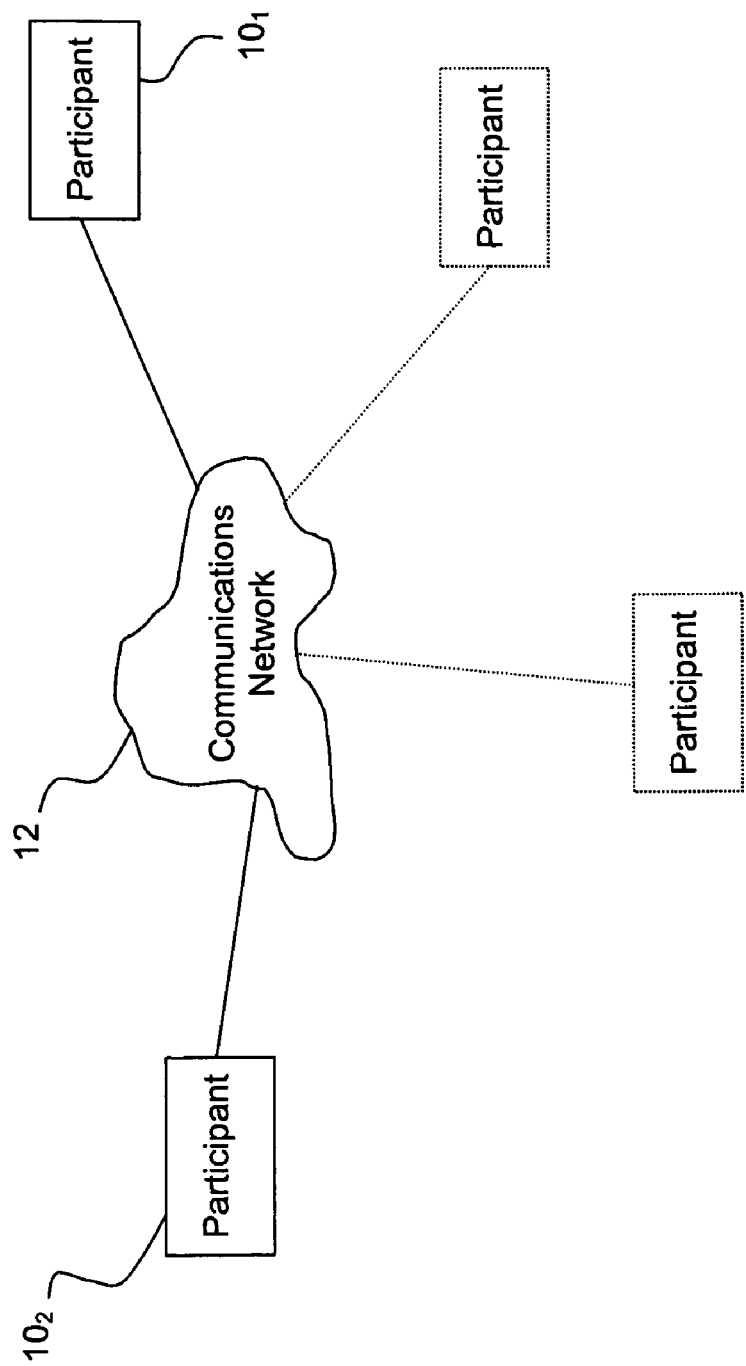
FIG. 1 is a schematic diagram illustrating a system for conducting a collaborative process between distributed participant systems.

In FIG. 1, distributed participant systems $10_1$, $10_2$ (in the following simply referred to as participants) are linked to each other through an asynchronous messaging network generally designated 12. Participants $10_1$, $10_2$ collaborate to carry out an electronic process such as, e.g., a trade or other business process. To effect collaboration, participants $10_1$, $10_2$ exchange messages between each other. Messaging network 12 ensures transport and delivery of such messages in an asynchronous fashion. The messages are produced and consumed by software applications embodying the participants. An order posting system for electronically posting purchase orders for goods with a supplier of such goods, and an order management system electronically handling incoming purchase orders on the part of that supplier are but two examples of software applications that can collaborate through exchange of messages.

The number of participants collaborating via messaging network 12 is at least two but can be any number greater than that. As an example, two additional participants depicted in dashed lines in FIG. 1 may partake in the collaborative process. It is to be understood that the present invention is not intended to be limited to a certain number of participants or a certain minimum or maximum number of participants.

Messaging network 12 may use for message transfer any form of wired or wireless, dedicated or public communications network such as, e.g., a local area network (LAN), a wide area network (WAN), a mobile communications network, or the Internet. Suitable transmission protocols, mechanisms and data formats to effect asynchronous communication between participants $10_1$, $10_2$ are widely known to those skilled in the art and need not be further detailed.

Figure 2:
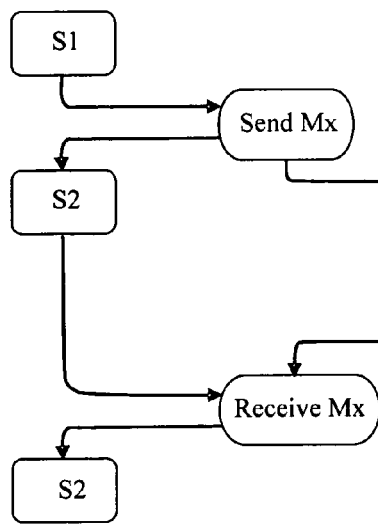
FIG. 2 depicts an exemplary activity diagram of the participant systems of FIG. 1.
Figure 2:
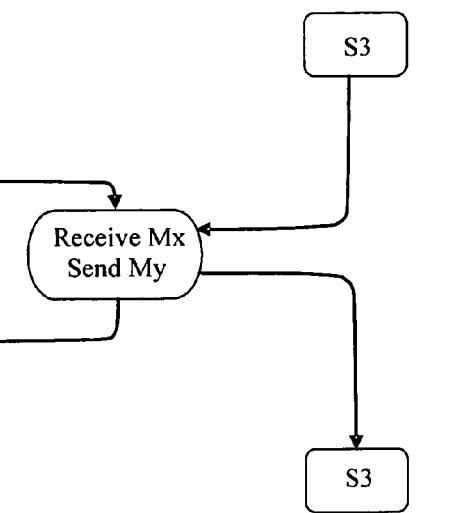
Figure 2:
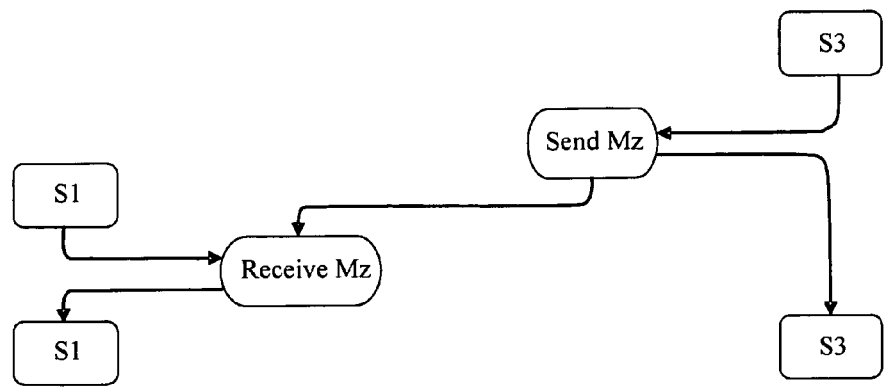

In the following, a purely illustrative and non-limiting example of a collaborative process is described for sake of facilitating understanding of the invention. This process is a bilateral process carried out between participants $10_1$ and $10_2$. The activity diagram depicted in FIG. 2 illustrates the way participants $10_1$ and $10_2$ interact in this process According to the activity diagram of FIG. 2, participant $10_1$, in response to a local triggering event not further specified, produces and emits a message Mx while in a local state S1. Message Mx is delivered through messaging system 12 to participant $10_2$. After having sent message Mx, participant $10_1$ is in a local state S2. That is, the sending of message Mx is accompanied by a state transition of participant $10_1$ from S1 to S2.

Participant $10_2$ receives and consumes message Mx in a local state S3. In response to receipt of message Mx, participant $10_2$ generates and emits a message My, which is sent over messaging system 12 to participant $10_1$. Having sent message My, participant $10_2$ remains in local state S3. That is, receipt of message Mx triggers a local state transition of participant $10_2$ that is a transition-to-self. Resulting event of this local state transition is the sending of message My.

Participant $10_1$ receives message My in local state S2 and remains in this local state even after consumption of message My. Receipt of message My thus triggers a local transition-to-self of participant $10_1$, with local state S2 being the starting state and the target state of this state transition. Consumption of message My will cause some form of a local event to occur at participant $10_1$. As the type and nature of this local event are of no relevance for the purpose of the present invention, it is not further specified in the activity diagram of FIG. 2.

While in local state S3, participant $10_2$ may also produce a message Mz in response to a local triggering event. Message Mz is then sent to participant $10_1$. Emission of message Mz is accompanied by a local state transition of participant $10_2$ from S3 to S3, i.e., a transition-to-self. Message Mz can be received and consumed by participant $10_1$ while the latter is in local state S1. Reception of message Mz triggers a local transition-to-self of participant $10_1$ with S1 as the starting state and the target state of this state transition. Again, local events serving as a trigger for the emission of message Mz by participant $10_2$ and resulting from consumption of message Mz on the part of participant $10_1$ are not detailed in the activity diagram of FIG. 2.

Figure 3:
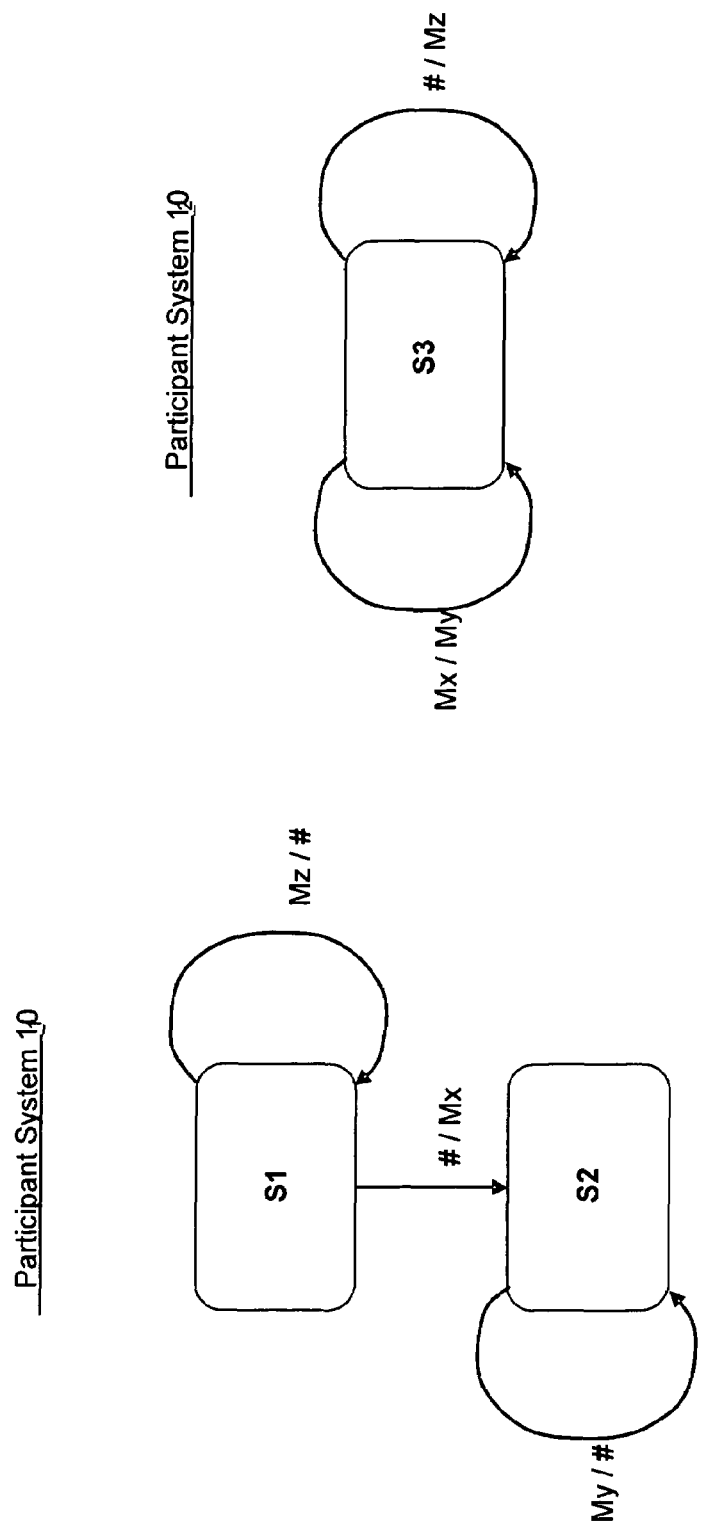
FIG. 3 schematically illustrates local state chart diagrams related to the activities depicted in FIG. 2.

FIG. 3 illustrates by way of UML state chart diagrams the activities of participants $10_1$, $10_2$ as shown in FIG. 2. On the left hand side of FIG. 3 a local state chart diagram for participant $10_1$ is shown, and on the right hand side of FIG. 3 a similar diagram is shown for participant $10_2$. In these state chart diagrams, boxes represent local states assumed by the participants in the course of the process, and arrows represent state transitions. An arrow may point from one box to another; in this case the local state of the corresponding participant system changes as a result of the state transition. An arrow may also loop back to the same box; in this case the local state remains unchanged, that is the corresponding participant system undergoes a transition-to-self. Descriptions associated with the arrows indicate triggering and resulting events of the local state transitions. The first portion of each arrow description specifies a triggering event, while the second portion indicates an event resulting from the state transition . . . # stands for an event that is local to the corresponding participant system and unrelated to communication activities between participant systems $10_1$, $10_2$. A local triggering event can, e.g., be an input of data related to ordering, budgeting, accounting or other business procedures by a user. A local resulting event can, e.g., involve the output of such data for storage in a local database, for display on a local monitor, or for printing on a printer or plotter.

UML state chart diagrams such as shown in FIG. 3 provide a simple means of specifying the choreography of the collaboration between various distributed participants. Yet they only specify scenarios that have been explicitly considered by the designer or the team of designers of the collaborative process. In case of collaborative processes that involve a great many of messages and local states of the participants, it is not unlikely for the process designer(s) to inadvertently leave some scenarios unconsidered that nevertheless may occur in practice. Such unspecified scenarios, in the event of their occurring, will lead to an error and interrupt proper execution of the process.

The present invention provides a tool that enables a process designer to verify completeness and consistency of a collaborative process specification during the design phase. A main feature of this tool is an examination procedure that draws on data that describes the participants' local state transition behavior, and calculates from this data a global state machine model of the collaboration process taking into account both the local states of all participants and the messages that may be exchanged between the participants. Such data can be readily available from UML state chart diagrams as conventionally used by software developers as a means for specifying the process. Once established, the state machine model of the collaborative process allows easy identification of any unspecified scenarios, giving the process designer(s) an early opportunity in the design phase to perfect the process specification.

Figure 4:
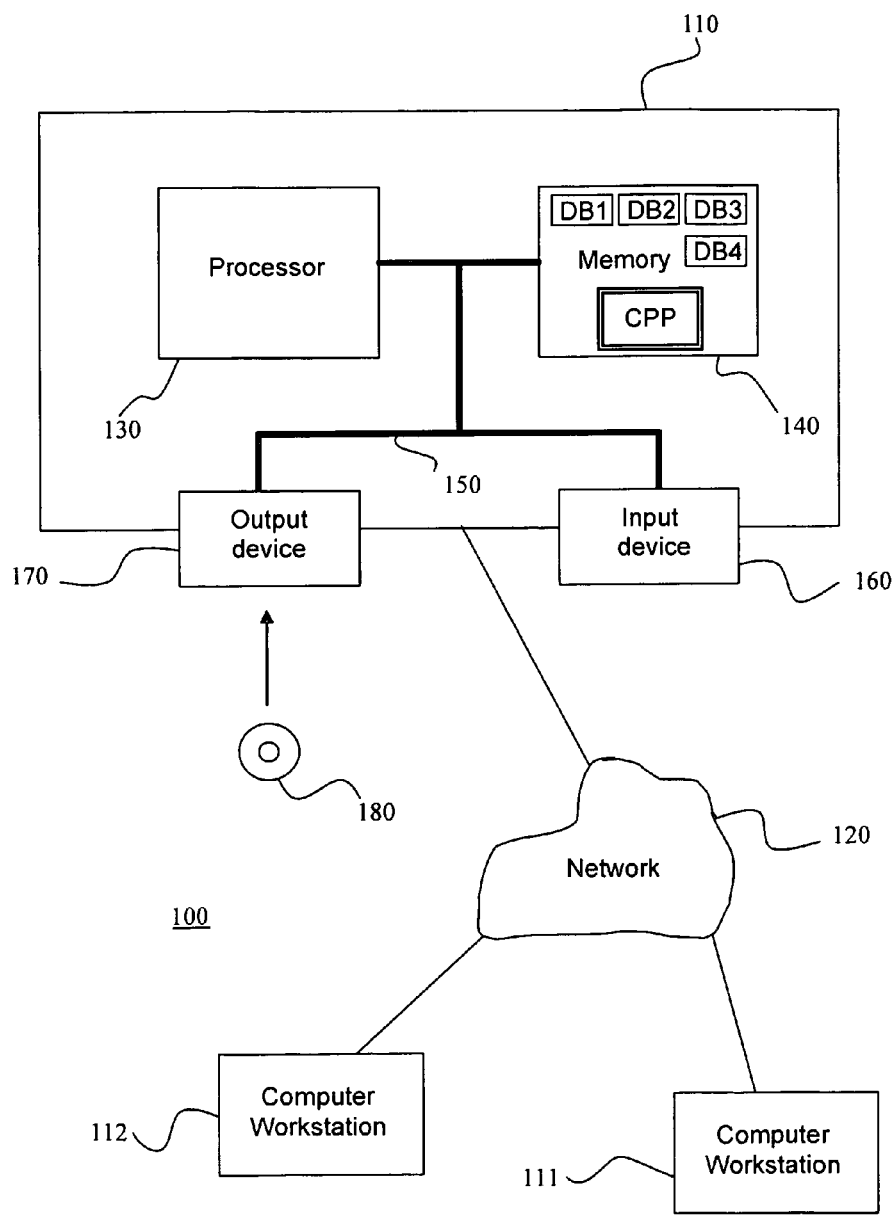
FIG. 4 is a schematic diagram of a computer system used for carrying out a collaboration checking procedure according to the present invention.

The task of designing a collaborative process can be assigned to a single developer. In practice, however, such a task is often times assigned to a team of distributed developers. FIG. 4 illustrates an exemplary computer system that can serve as a development environment for the development of software for a computer-implemented collaborative process. The computer system, generally designated 100, comprises at least one computer workstation 110, preferably a number of computer workstations 110, 111, 112 . . . coupled to each other via a network 120. In the case of distributed developers partaking in the process design, each developer can work from one of computer workstations 110, 111, 112 . . . . Computer workstation 110 comprises a processor 130, a memory 140, a bus 150, and one or more input devices 160 and output devices 170 acting as a user interface. The components of workstation 110 interoperate in a manner conventionally known in the art. A collaboration checking procedure according to the present invention is embodied in a computer program product (CPP) stored in memory 140 and/or in a storage location outside computer workstation 110, e.g., on a separate program carrier 180.

Computer workstations 110, 111, 112 . . . are also referred to as remote computers. They can be servers, routers, peer devices, or other common network nodes, and will typically include many or all of the components indicated in regard of computer workstation 110. Hence, components 130–180 of computer workstation 110 may collectively illustrate corresponding components in other computer workstations connected to network 120.

Computer workstation 110 can, e.g., be a personal computer (desktop or notebook computer), a minicomputer, a multiprocessor computer, a mainframe computer, a mobile computing device, a programmable personal digital assistant, or the like. Processor 130 can, for example, be a central processing unit (CPU), a digital signal processor (DSP), a micro-controller, or the like.

Memory 140 symbolizes components that allow to store data and/or instructions permanently or temporarily. Although memory 140 is illustrated in FIG. 4 as a distinct component part of computer workstation 110, it can be implemented by suitable storage resources within processor 130 itself (register, cache, etc.), in nodes of network 120, in other computer workstations, or elsewhere. Specifically, memory 140 can include a read only memory (ROM) portion, e.g., for permanently storing program files, and/or a random access memory (RAM) portion for storing data such as variables and operation parameters. It can be physically implemented by any type of volatile and non-volatile, programmable and non-programmable, magnetic, optical, semiconductor and other information storage means conventionally known in the art, for example, hard disk, floppy disk, CD-ROM, DVD, DRAM, SRAM, EPROM, EEPROM, memory stick, etc.

Memory 140 can store software support modules such as, for example, a basic input/output system (BIOS), an operating system, a program library, a compiler, an interpreter, communication programs, driver, protocol converters, and application software programs (e.g., text processor, browser, database application, etc.).

The CPP provides in a computer readable manner, program code executable by processor 130. When loaded, the program code causes processor 130 to carry out steps of the before-mentioned collaboration checking procedure. A detailed description of the collaboration checking procedure will be given further below. The CPP controls operation of computer workstation 110 and, if necessary, its interaction with other components of computer system 100. It may be available as source code in any suitable programming language, e.g., C++, or as object code in a compiled presentation. Although FIG. 4 illustrates the CPP as stored in memory 140, it may as well be located on program carrier 180 outside computer workstation 110. If the CPP is stored on program carrier 180, input device 160 will be adapted to allow insertion of program carrier 180 into input device 160 to retrieve the CPP. Rather than storing the program code in memory 140 or on program carrier 180, the CPP can also be provided to processor 130 in the form of program signals delivered through network 120 from a remote computer. The steps embodied by the program code of the CPP can be carried out solely within computer workstation 110 or in a distributed manner by more than one of computer workstations 110, 111, 112 . . . .

Input device 160 serves to input data and/or instructions for being processed by computer workstation 110. The term input device encompasses, for example, a keyboard, a pointing device (mouse, trackball, cursor direction keys), a reading device for reading information stored on a separate information carrier (e.g., a drive for reading information from a disk, or a card reader for retrieving data from a memory card), a receiver for receiving information transmitted to computer workstation 110 from other components of computer system 100 through a wired or wireless link, a scanner, etc.

Output device 170 serves to present information resulting from processing activities within computer workstation 110. Output device 170 can, e.g., include a monitor or display, a plotter, a printer, or the like. Similarly to input device 160, output device 170, while mainly communicating with a user through visual or other presentation of processing results, may also communicate with other components of computer system 100. Thus, output device 170 may communicate a processing result through a wired or wireless link to a remote recipient.

Input device 160 and output device 170 can be combined in a single device.

Bus 150 and network 120 provide logical and physical connections by conveying instruction and data signals. While connections and communications within computer workstation 110 are handled by bus 150, connections and communications between different computers of computer system 100 and handled by network 120. Network 120 may comprise gateway and router computers dedicatedly programmed to effect data transmission and protocol conversion.

Input and output devices 160, 170 are coupled to computer workstation 110 through bus 150 (as illustrated in FIG. 4) or through network 120 (optionally). While signals inside computer workstation 110 will mostly be electrical signals, signals occurring across network 120 can be any signal type, e.g., electrical, optical, or radio.

Network 120 can be one with wired or wireless access and wired or wireless signal transmission across network 120. It can, e.g., include a LAN, a WAN, a wireless LAN, a public switched telephone network (PSTN), an integrated services digital network (ISDN), or a mobile communications network such as a UMTS (Universal Mobile Telecommunications System), GSM (Global System for Mobile Communication), or CDMA (Code Division Multiple Access) network.

Suitable transmission protocols, mechanisms and data formats to effect communication between computers of computer system 100 can, for example, include Transmission Control Protocol/Internet Protocol (TCP/IP), Hyper Text Transfer Protocol (HTTP), secure HTTP, Wireless Application Protocol (WAP), Unique Resource Locator (URL), Unique Resource Identifier (URI), Hyper Text Markup Language (HTML), Extensible Markup Language (XML), Extensible Hyper Text Markup Language (XHTML), Wireless Application Markup Language (WML), Electronic Data Interchange (EDI), which governs the electronic exchange of business information between or within organizations and their IT (Information Technology) infrastructure in a structured format, Remote Function Call (RFC), an application programming interface (API), etc.

Figure 5:
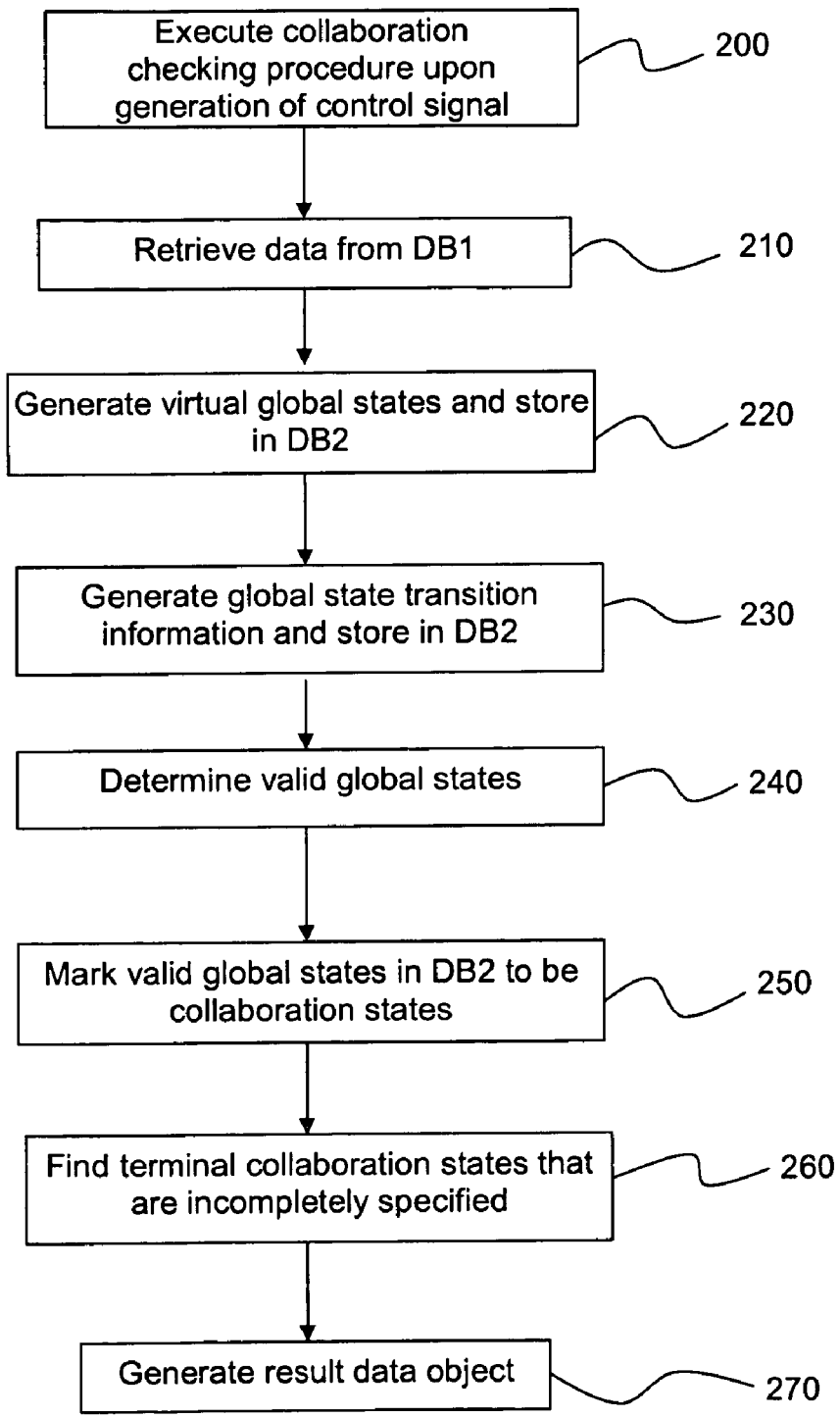
FIG. 5 is a flow chart diagram of steps involved in one embodiment of the collaboration checking procedure.

In the following, one embodiment is described of a collaboration checking procedure for conducting an examination of a design for a collaborative process using the computer topology illustrated in FIG. 4. FIG. 5 depicts by way of a flow chart diagram, main steps of the collaboration checking procedure.

First, a user effects start of execution of the program code included in the CPP. To this end, a control signal is generated through user-operation of an activator element. The activator element can, e.g., a control button displayed on a graphical user interface created on a monitor by a software program application resident on computer workstation 110. The user can activate the control button on the screen by means of a mouse pointer. Activation of the control button generates a control signal that causes processor 130 to execute the collaboration checking procedure (step 200 in FIG. 5)

In executing the collaboration checking procedure, processor 130 retrieves data specifying the process to be examined from a storage location DB1 (step 210 in FIG. 5). This process specification data includes information on local states and local state transitions of the process participants along with associated triggering and resulting events. In one embodiment, the participants' local states can be made up of a single state each. In an alternate embodiment, they can be made up of a plurality of states each associated with a respective one of various sub-systems of the respective participant. Such a sub-system can, e.g., be a software object representing a business object used in a business software program application. The process specification data can be stored in a database, a file, or any other organizational structure. The storage location DB1 can be within memory 140 of computer workstation 110, or on any other computer workstation 111, 112 . . . connected to computer system 100, or even on a network server of network 120. The storage location DB1 can be a shared resource giving all developers in a development team access to the data in the storage location DB1.

Taking the example process specified by the UML state chart diagrams of FIG. 3, the participants' $10_1$, $10_2$ process specification data can, e.g., be stored in the storage location DB1 as a list of local state transition vectors (LSTV) each representing a single local state transition (LST) such as illustrated in the following table:

| LSTV | LST |
|---|---|
| (10__1; S1; S2; #; Mx) | 1 |
| (10__1; S2; S2; My; #) | 2 |
| (10__1; S1; S1; Mz; #) | 3 |
| (10__2; S3; S3; #; Mz) | 4 |
| (10__2; S3; S3; Mx; My) | 5 |

The first element in each LSTV vector represents the participant affected by the particular local state transition, i.e., participant $10_1$ or $10_2$. The second and third vector elements represent the starting local state and the target local state, respectively. The fourth and fifth elements in each LSTV vector represent the triggering and resulting events of the local state transition considered, with the same denotation used for these events as in the state chart diagrams of FIG. 3. One skilled in the art will be readily able to verify that the five local state transition vectors listed above cover all the scenarios specified by the state chart diagrams of FIG. 3.

Having retrieved the process specification data from storage location DB1, processor 130, under control of the program code provided by the CPP, processes this data to generate, and store in another storage location DB2, information representing a set of global state vectors (step 220 in FIG. 5). In one embodiment, each global state vector is composed of a plurality of first global state vector elements, one in relation to each participant, and a plurality of second global state vector elements, one in relation to each message Mx, My, Mz. The first global state vector elements indicate a local state of the respective participant, and the second global state vector elements indicate whether or not the respective message is underway between participants $10_1$ and $10_2$. To this end, the second global state vector elements can conveniently be binary values.

In an alternate embodiment, the global state vectors are composed of a plurality of first global state vector elements, one in relation to each participant, and second global state vector elements in relation to those messages only that are underway between the participants. Thus, a global state vector will have no second global state vector element if no message is underway, and one or more second global state vector elements if a corresponding number of messages is underway. Each second global state vector element will indicate a particular one of messages Mx, My, Mz that is underway.

In any event, the global state vectors are formed in dependence of each participant's local state and each message's communication status, i.e., whether the respective message is being communicated (underway) or not. For the purpose of the example process described herein, it is assumed in the following that the global state vectors contain a binary value for each message.

Using global state vectors an imaginary global state machine can be defined whose states, hereinafter referred to as virtual global states, are each represented by a respective global state vector and whose current virtual global state hence depends on the current local states of all participants of the collaborative process as well as the state of presence or non-presence of each message, i.e., whether or not the corresponding message is being communicated.

The storage location DB2 can, e.g., be within memory 140 of computer workstation, as is illustrated in FIG. 4. Alternately, it can be a storage location external to computer workstation 110, for example, in a node of network 120 or in another one of computer workstations 111, 112 . . . connected to network 120. The global state vectors can be stored at the storage location DB2 in any organizational form such as a simple data set, a database, a file, etc. The global state vectors can even be kept in one or more internal registers of processor 130 and deleted, or removed to another location, after completion of the calculations performed by processor 130 in the course of the collaboration checking procedure.

The set of global state vectors determined by processor 130 is comprised of vectors of any combination of values of the first and second global state vector elements. The total number N of global state vectors to be generated by processor 130 can be calculated by:

$$N = \Pi m_i \times 2^k \ (i=1, 2, \ldots n)$$

where Π represents a mathematical product, $m_i$ represents the total number of local states of an individual process participant 10$_i$, with $\Pi\, m_i$ thus representing the product of the total local state numbers of all process participants 10$_1$, 10$_2$ . . . , and k represents the total number of messages that may occur.

In the example process specified by the UML state chart diagrams of FIG. 3, the total number of local states of participant 10$_1$ is 2 (S1, S2), the total number of local states of participant 10$_2$ is 1 (S3), and the total number k of messages is 3 (Mx, My, Mz). The total number N of global state vectors, hence virtual global states, for the example process is therefore:

$$N = 2 \times 1 \times 2^3 = 16$$

The global state vectors will have five vector elements each, two indicating the local states of participants 10$_1$, 10$_2$ and three others indicating presence or non-presence of messages Mx, My, and Mz. The following table illustrates all 16 global state vectors (GSV) and corresponding virtual global states (VGS) that can be formed in the case of the example process:

| GSV | VGS |
|---|---|
| (S2; S3; 1; 1; 1) | 0 |
| (S2; S3; 1; 1; 0) | 1 |
| (S2; S3; 1; 0; 1) | 2 |
| (S2; S3; 1; 0; 0) | 3 |
| (S2; S3; 0; 1; 1) | 4 |
| (S2; S3; 0; 1; 0) | 5 |
| (S2; S3; 0; 0; 1) | 6 |
| (S2; S3; 0; 0; 0) | 7 |
| (S1; S3; 1; 1; 1) | 8 |
| (S1; S3; 1; 1; 0) | 9 |
| (S1; S3; 1; 0; 1) | 10 |
| (S1; S3; 1; 0; 0) | 11 |
| (S1; S3; 0; 1; 1) | 12 |
| (S1; S3; 0; 1; 0) | 13 |
| (S1; S3; 0; 0; 1) | 14 |
| (S1; S3; 0; 0; 0) | 15 |

In the above table, the first element of each global state vector indicates the local state of participant 10$_1$, the second vector element indicates the local state of participant 10$_2$. The last three vector elements are associated to messages Mx, My, and Mz, in that order. Here, a binary value 1 may symbolize presence of a particular message, whereas a value 0 may represent non-presence of that message, or conversely.

As an example, virtual global state VGS 14 defines a constellation where participant 10$_1$ is in local state S1, participant 10$_2$ assumes local state S3, message Mx is non-present (assuming an interpretation of "0" as being indicative of non-presence), message My is also non-present, and message Mz is underway.

Having generated and stored information representing the set of global state vectors in the above-described manner, processor 130 proceeds by generating global state transition information that describes the global state transition behavior of the above-mentioned virtual global state machine having all the virtual global states. Specifically, processor 130 determines all global state transitions that may occur in the virtual global state machine as a consequence of the local state transitions as specified by the process specification data stored in storage location DB1.

Even more specifically, taking one of the local state transitions and one of the virtual global states, processor 130 checks if the starting local state of that local state transition is identical to the local state indicated for the corresponding participant in the virtual global state. If the starting local state of the local state transition is different from that participant's local state as indicated in the virtual global state, the local state transition is impossible to occur in that virtual global state, i.e., it is not applicable. However, if there is identity between the starting local state of the local state transition and the local state indicated for the participant in the virtual global state, it is additionally checked if the trigger of the local state transition is a local event or an incoming message that is indicated as present, or underway, in the virtual global state. If this is true, the local state transition may occur in the virtual global state, i.e., it is applicable. On the other hand, if the trigger of the local state transition is a message that is non-present in the virtual global state considered, the local state transition is impossible to occur in that virtual global state, i.e., it is not applicable.

Once a local state transition has been found applicable to a virtual global state, a new, or target, virtual global state is determined that will result from that local state transition. To this end, it is determined what is the target local state of the participant experiencing the local state transition. Taking into account the fact that any triggering message is consumed as a consequence of the local state transition and therefore ceases to exist, and taking also into account any resulting message that may come into existence as an accompaniment to the local state transition, the new virtual global state can be easily determined based on the target local state, which is taken as the local state of the corresponding participant in the new virtual global state, and also based on the consumption and production of any messages.

To facilitate understanding of the above, a description of an example follows where it is checked which of local state transitions LST 1–LST 5 of the example process are applicable to virtual global state VGS 3 from the table above. One finds easily that only two local state transitions are applicable, while the remaining three are impossible to occur in VGS 3. The applicable local state transitions are LST 4, defined by vector (10_2; S3; S3; #; Mz), and LST 5, defined by vector (10_2; S3; S3; Mx; My). LST 4 is a local state transition of participant 10$_2$ from local state S3 to that same state, i.e., a transition-to-self, in response to a local triggering event #, with the emission of message Mz as the resulting event. As the starting local state of LST 4 is identical to the local state indicated for participant 10$_2$ in virtual global state VGS 3, namely S3, and as the trigger of the local state transition is an event local to participant 10$_2$, the conclusion is that LST 4 is applicable to VGS 3. Application of LST 4 to VGS 3 results in a global state transition from VGS 3 to VGS 2. No message is consumed in this local state transition as it is triggered by a local event. On the other hand, LST 4 causes production and emission of message Mz. From a global perspective, LST 4 thus adds a further message, Mz, to message Mx already existent in VGS 3. Target virtual global state of the global state transition caused by LST 4 is therefore a virtual global state in which participant $10_1$ is in local state S2 (participant $10_1$ is left unaffected by this local state transition), participant $10_2$ is in local state S3 (participant $10_2$ experiences a transition-to-self), and both messages Mx and Mz are existent. The one virtual global state meeting this scenario is VGS 2.

Local state transition LST 5 is likewise applicable to virtual global state VGS 3. LST 5 is a transition-to-self of participant $10_2$ from local state S3 to that same state, with message Mx triggering the transition and message My being emitted as a result. Therefore, LST 5 has a starting local state identical to that which is required by VGS 3 as the local state of participant $10_2$, S3. Moreover, message Mx, the trigger of LST 5, is a message existent in VGS 3, as indicated by the value "1" of the third vector element in the global state vector corresponding to VGS 3. Consequently, local state transition LST 5 is possible to occur in virtual global state VGS 3.

Application of LST 5 to VGS 3 results in a global state transition from VGS 3 to VGS 5. As before, participant $10_1$ remains unaffected by this local state transition, and participant $10_2$ undergoes a transition-to-self. However, LST 5 leads to consumption of message Mx while message My is produced by participant $10_2$. Therefore, target virtual global state of the global state transition caused by LST 5 is a virtual global state in which participants $10_1$, $10_2$ are in local states S2 and S3, respectively, and message My is present only. Virtual global state VGS 5 represents this scenario.

The remaining local state transitions LST 1, LST 2, and LST 3 are not applicable to virtual global state VGS 3. LST 1, represented by vector (10_1; S1; S2; #; Mx), requires local state S1 to be the starting local state of participant $10_1$, much like LST 3, represented by vector (10_1; S1; S1; Mz; #). This, however, contrasts with the requirement of VGS 3 that participant $10_1$ be in local state S2. Finally, LST 2, represented by vector (10_1; S2; S2; My; #), needs message My as the trigger. In virtual global state VGS 3, however, no message My is underway as indicated by the value "0" of the fourth vector element in the global state vector corresponding to VGS 3. Therefore, local state transitions LST 1, LST 2, and LST 3 are impossible to occur in virtual global state VGS 3.

Generally, processor 130 checks applicability of every local state transition in relation to every virtual global state, and then determines for each applicable situation what is the target virtual global state that will result from application of a particular local state transition to a particular virtual global state. In this way, processor 130 obtains global state transition information that is added to storage location DB2 (step 230 in FIG. 5). Thereafter, storage location DB2 includes all the information necessary to create a global state transition graph of a virtual global state machine having all the virtual global states. The virtual global states form nodes of the graph, and connections between nodes represent global state transitions experienced by the virtual global state machine when subjected to local state transitions. As with the local state transitions, global state transitions can involve a transition from one virtual global state to another, or a transition-to-self looping back to the same virtual global state.

Figure 6:
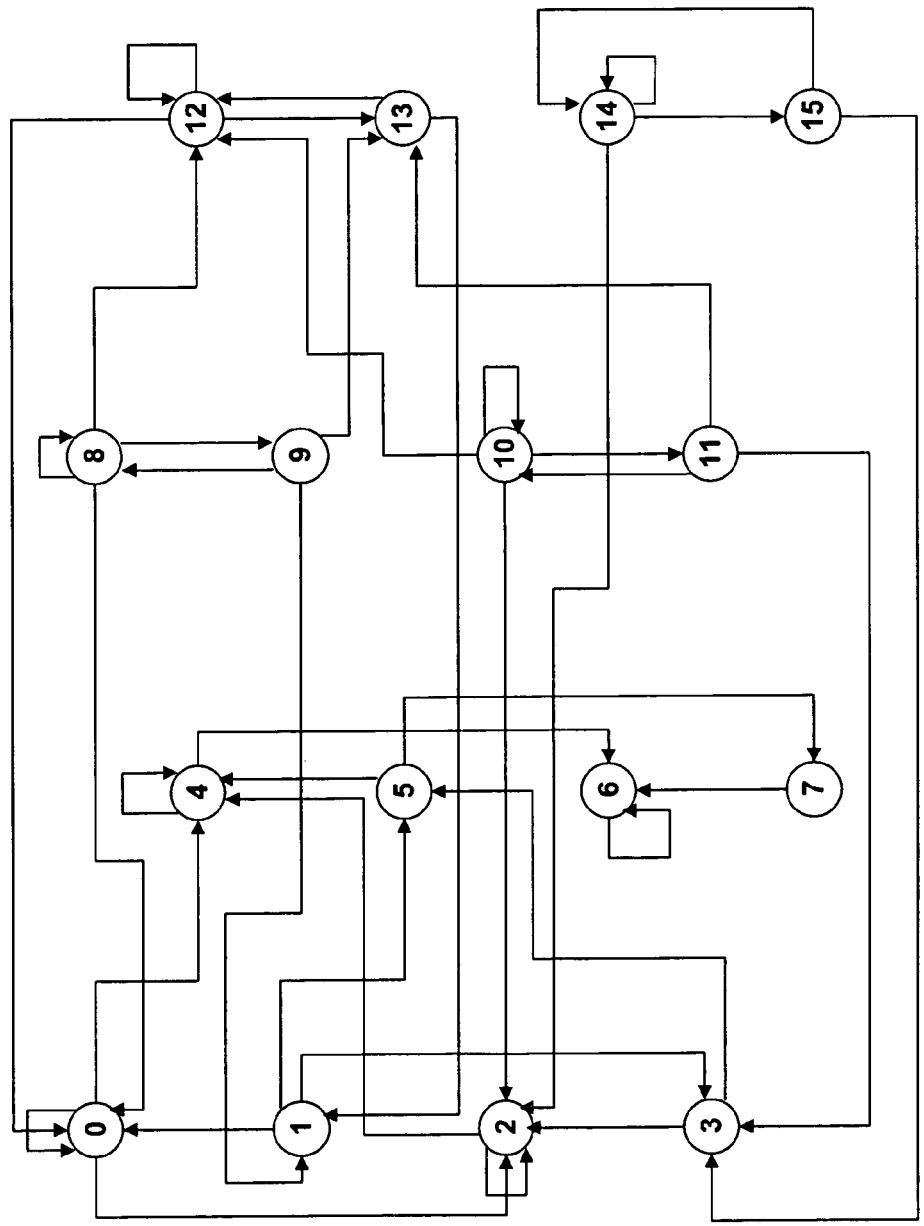
FIG. 6 illustrates an example of a virtual global state machine related to the activities depicted in FIG. 2.

FIG. 6 illustrates by way example a global state transition graph established for the example process specified by the UML state chart diagrams of FIG. 3. The nodes of this graph represent the virtual global states VGS 0–VGS 15, and arrows connecting the nodes represent all the global state transitions that result from applying the local state transitions LST 1–LST 5 to the virtual global states VGS 0–VGS 15 in the manner described above. One ordinarily skilled in the art will be readily able to verify the global state transitions depicted in the graph of FIG. 6. In particular, one can easily recognize in the graph of FIG. 6 two arrows that represent the two exemplary global state transitions discussed above in connection with virtual global state VGS 3, namely an arrow pointing from VGS 3 to VGS 5 and another leading from VGS 3 to VGS 2.

Having entirely generated, and stored in storage location DB2, all the information on the virtual global states and the global state transitions in the above manner, processor 130 uses this information to determine a subset of valid global states from the virtual global states (step 240 in FIG. 5). That is, not all virtual global states may actually occur when carrying out the collaborative process under examination. In practice, the collaborative process will start with no message being underway. Further, there must be specified at least one local state transition applicable to one of the participants to the collaborative process at the time the collaborative process starts. The trigger of such local state transition must be an event local to the corresponding participant, since no message is underway at the time the collaborative process starts. These restraints will limit the number of virtual global states that may actually be entered when carrying out the collaborative process to a subset of virtual global states called valid global states hereinafter.

To determine the valid global states, processor 130 retrieves the information from storage location DB2 and proceeds with identifying one or more initial global states among the virtual global states, with an initial global state being defined as one in which at least one local state transition as specified by the local state transition data and involving a local trigger is applicable to the initial global state and no message is being communicated between the participants. Further, the local state transition must not result in a global state transition looping back to the same starting global state.

Referring to the example process specified by the state chart diagrams of FIG. 3, the only virtual global states that have no messages underway are VGS 7 and VGS 15. In VGS 7, participant $10_1$ is in local state S2 and participant $10_2$ is in local state S3. A comparison of local state transitions LST 1–LST 5 shows that LST 4 is applicable to VGS 7 since it has a local trigger and requires a starting local state that is identical to the local state of one of participants $10_1$, $10_2$ in VGS 7. Application of LST 4 to VGS 7 leads to VGS 6, which is different from the starting virtual global state VGS 7. Therefore, virtual global state VGS 7 is an initial global state. No other local state transition is applicable to VGS 7 though.

As for VGS 15, this is a virtual global state to which local state transitions LST 1 and LST 4 are applicable, both requiring a local trigger and having starting local states identical to the local state of one of participants $10_1$, $10_2$ in VGS 15. Application of LST 1 and LST 4 to VGS 15 leads to VGS 3 and VGS 14, respectively. Again, the target virtual global states are different from the starting virtual global state. Hence, virtual global state VGS 15 is another initial global state.

Next, processor 130 determines for each initial global state found, all virtual global states that can be reached by the virtual global state machine when starting from an initial global state. The initial global state and every virtual global state reachable from that initial global state are then determined to be valid global states.

As an example, by screening the global state transition graph of FIG. 6 for valid virtual global states, or nodes, one can easily find that, in addition to starting nodes 7 and 15, nodes 2, 3, 4, 5, 6, and 14 are valid nodes. These are the only nodes that can be reached in the global state transition graph of FIG. 6 when starting from either of nodes 7 and 15. The remaining nodes 1, 8, 9, 10, 11, 12, and 13, cannot be reached from nodes 7 and 15 and therefore represent invalid virtual global states. Eliminating in the global state transition graph of FIG. 6 any invalid nodes and any connections between invalid nodes and between invalid and valid nodes results in the partial graph shown in FIG. 7, which represents a valid global state machine model of the collaboration process specified by the state chart diagrams of FIG. 3.

In an alternate embodiment, only one virtual global state may be allowed as an initial global state. Further, the definition of an initial global state may be altered or supplemented to refer to a virtual global state for which no state transition exists of which it is the target virtual global state.

Hereinafter, a valid global state machine model of a collaborative process is referred to as a collaboration state machine model of the process. Its states are called collaboration states and are constituted by the valid virtual global states forming the valid nodes of the global state transition graph. A collaboration state machine model for a process specification under examination is thus defined by the entirety of valid virtual global states of the process as specified and the entirety of valid global state transitions, i.e., global state transitions involving valid virtual global states both on the starting and the target sides. Such valid global state transitions are referred to hereinafter as collaboration state transitions. In a step 250 in FIG. 5, processor 130 labels every valid global state stored in storage location DB2 to be a collaboration state, by adding a suitable annotation object.

Subsequently, processor 130 analyzes the collaboration state machine model for presence of incompletely specified terminal collaboration states (step 260 in FIG. 5). A terminal, or dead-end, collaboration state is one that is never the starting state of a collaboration state transition that would lead to a different collaboration state. In other words, a terminal collaboration state is a node in the collaboration state machine model that has no outbound state transitions and therefore can not be left.

There may exist one or more terminal collaboration states where no messages are underway. Such terminal collaboration states may be acceptable and are not deemed incompletely specified. Only a terminal collaboration state where one or more messages are underway indicates an incompleteness in the process specification. In order for the process specification to be complete and consistent, any such incompletely specified terminal collaboration states need to be corrected by the process designer(s).

Figure 7:
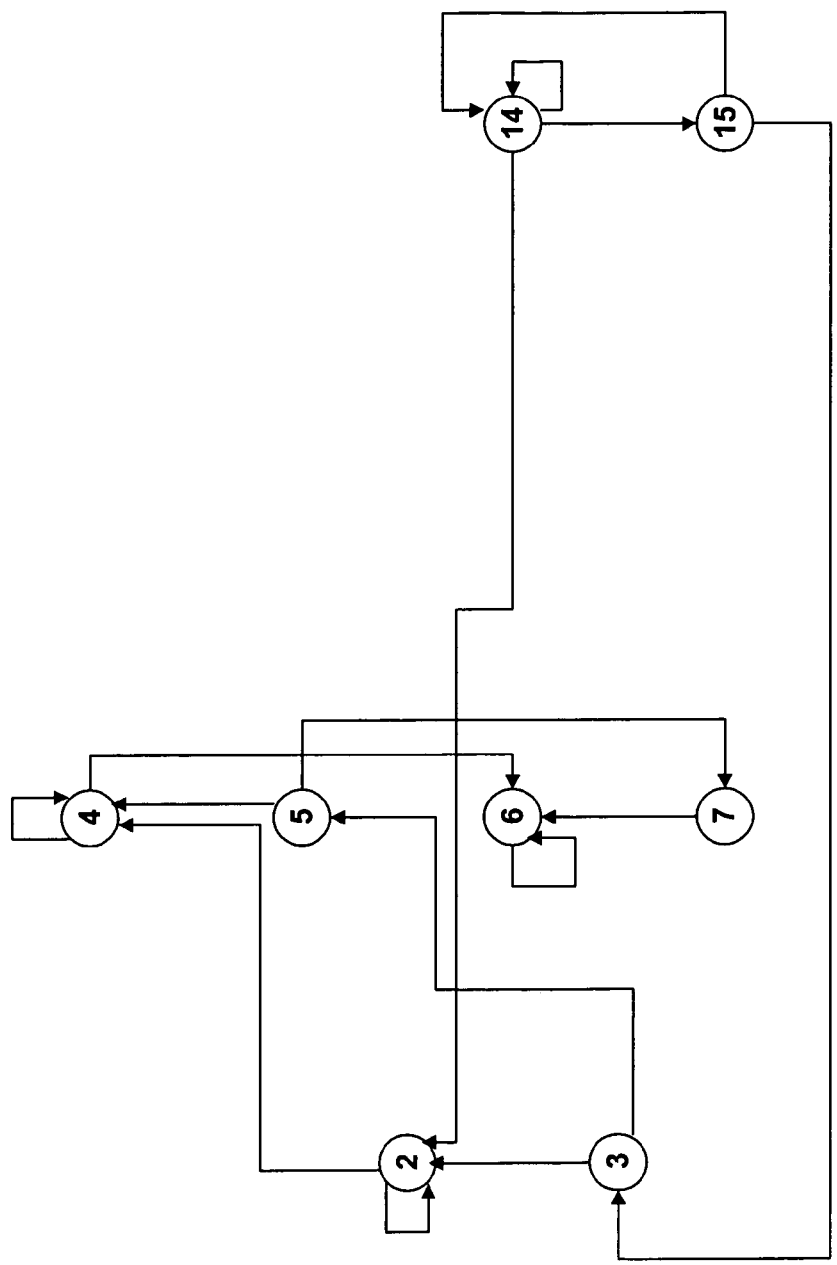
FIG. 7 illustrates an example of a collaboration state machine model related to the activities depicted in FIG. 2.

To explain this by way of an example, it is referred to FIG. 7. There, it can be seen that while each of collaboration states 2, 3, 4, 5, 7, 14, and 15 can be left through a collaboration state transition, collaboration state 6 is a terminal (dead-end) state. This collaboration state is associated with three collaboration state transitions, one pointing from collaboration state 4 to collaboration state 6, another one leading from collaboration state 7 to collaboration state 6, and a third one beginning with collaboration state 6 but looping back to its origin, i.e., a transition-to-self. There is no collaboration state transition originating from collaboration state 6 and leading to a different collaboration state.

Terminal collaboration state 6 points at an unspecified scenario in the design of the collaboration process. In fact, collaboration state 6 represents a situation where participant $10_1$ is in local state S2, participant $10_2$ is in local state S3, and message Mz is on its way. The specification of the example process does not deal with this situation; it leaves unanswered how message Mz shall be processed. The process specification is therefore incomplete and needs to be amended accordingly. On the other hand, if no message were underway in collaboration state 6, the situation might be tolerable as no processing of a message were necessary. In such case, collaboration state 6 would not be deemed incompletely specified.

In a following step designated 270 in FIG. 5, processor 130 effects generation, and preferably storage in a further storage location DB3, of a result data object containing information on every incompletely specified terminal collaboration state found. The storage location DB3 can be a database, a file, or any other suitable data repository that allows to hold data in an organized or structured manner. This location can be a resource accessible by some or all of the software developers involved in designing the process so as to enable plural developers to learn of the examination result of the collaboration checking procedure. To this end, it is conceivable that the result data object is stored on a network computer (server) of the computer system 100. Of course, storing the result data object in memory 140 of computer workstation 110 or anywhere else in the computer system 100 is also possible. For sake of illustration only, the result data object is shown in FIG. 4 as being stored in memory 140 of computer workstation 110.

In a preferred embodiment, the result data object can be forwarded to output device 170 to visually present on a display a graphical presentation object indicating every incompletely specified terminal collaboration state found. Specifically, processor 130 may effect display, or printing, of a result list containing at least every incompletely specified dead-end collaboration state. In one embodiment, the result list specifies every virtual global state as determined by processor 130 and indicates for each virtual global state whether or not the respective virtual global state is valid, whether or not it is a dead-end state, and whether or not it represents an incompleteness in the process specification. In an alternate embodiment, the result list may specify only those valid virtual global states that are found to be incompletely specified terminal collaboration states.

Part of an exemplary result list that may be presented to the developer on the graphical user interface displayed on output device 170 of computer workstation 110 is depicted in FIG. 8. There, a number indicating the respective virtual global state is followed by an annotation object AO1 that indicates whether or not the particular virtual global state is valid or invalid (i.e., a collaboration state). Another annotation object AO2 indicates in relation to every virtual global state whether or not the respective virtual global state is a dead-end state or a live-end state. A further annotation object AO3, finally, indicates whether or not the process specification under examination is complete in relation to the respective virtual global state.

Summarizing briefly the above collaboration checking procedure, processor 130 retrieves in response to a user-effected control signal, process specification data from a storage location DB1 and generates, and at least temporarily stores in another storage location DB2, information on virtual global states, global state transitions, and which of the virtual global states are valid global states, i.e., collaboration states. Thereafter, processor 130 retrieves the information stored in the storage location DB2 to determine incompletely specified dead-end collaboration states. Finally, processor 130 generates a result data object containing information on every incompletely specified terminal collaboration state found. The result data object can be stored in yet another storage location and/or forwarded to a graphical output device for visual presentation of a presentation object on a display, for example, in the form of a result list indicating every incompletely specified dead-end collaboration state.

The collaboration checking procedure as briefly summarized above has been described in the foregoing as starting out from process specification data specifying local states and state transitions for each participant system. In some cases, however, information on the participants' local states and local state transitions may not be readily available. That is, in some cases the collaborative process may be specified by the process designer(s) in relation to individual software objects of a participant system rather than the participant system as a whole. Each participant system can comprise a plurality of such software objects, which form functional units having unique states and experiencing unique state transitions in response to triggering events such as incoming messages or local events.

Figure 9:
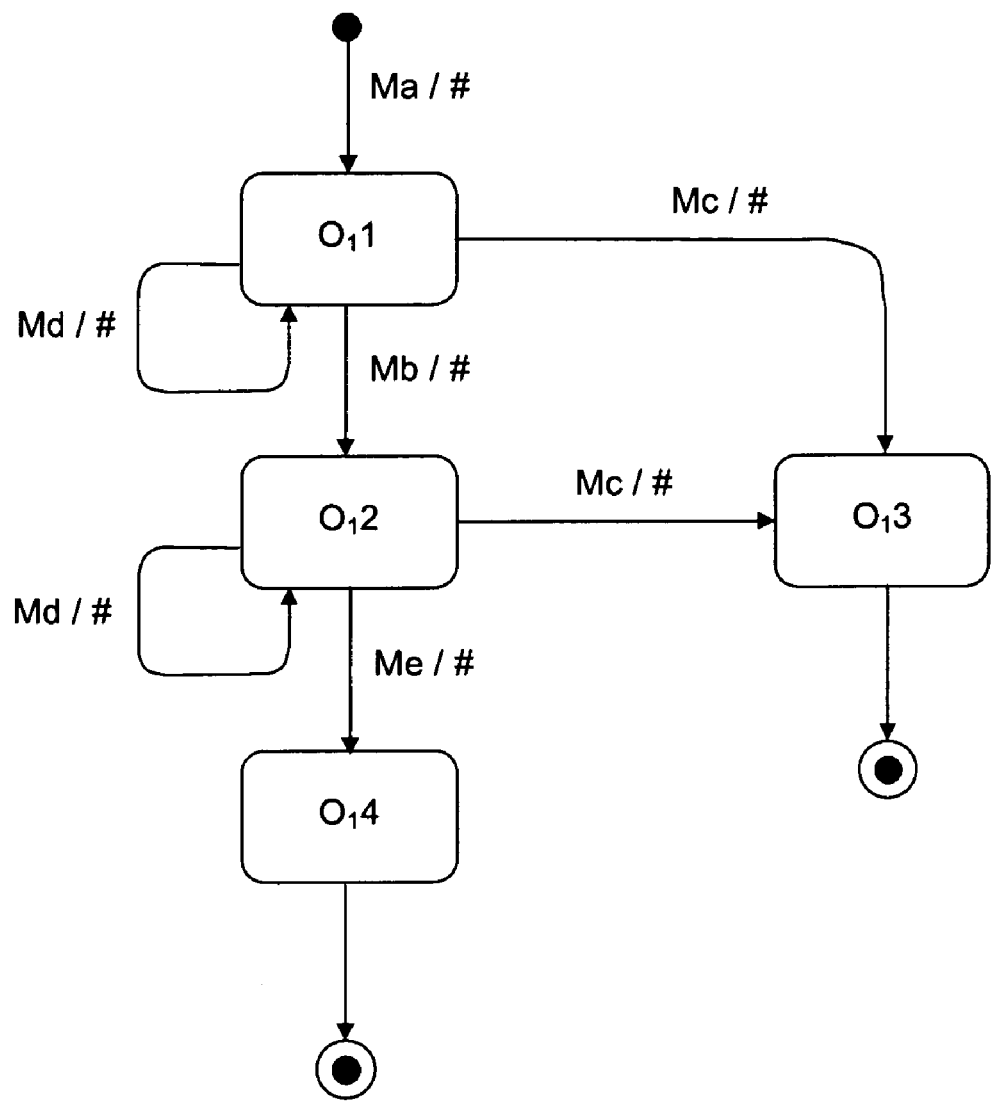
FIGS. 9 and 10 schematically illustrate state chart diagrams of two exemplary software objects.
Figure 10:
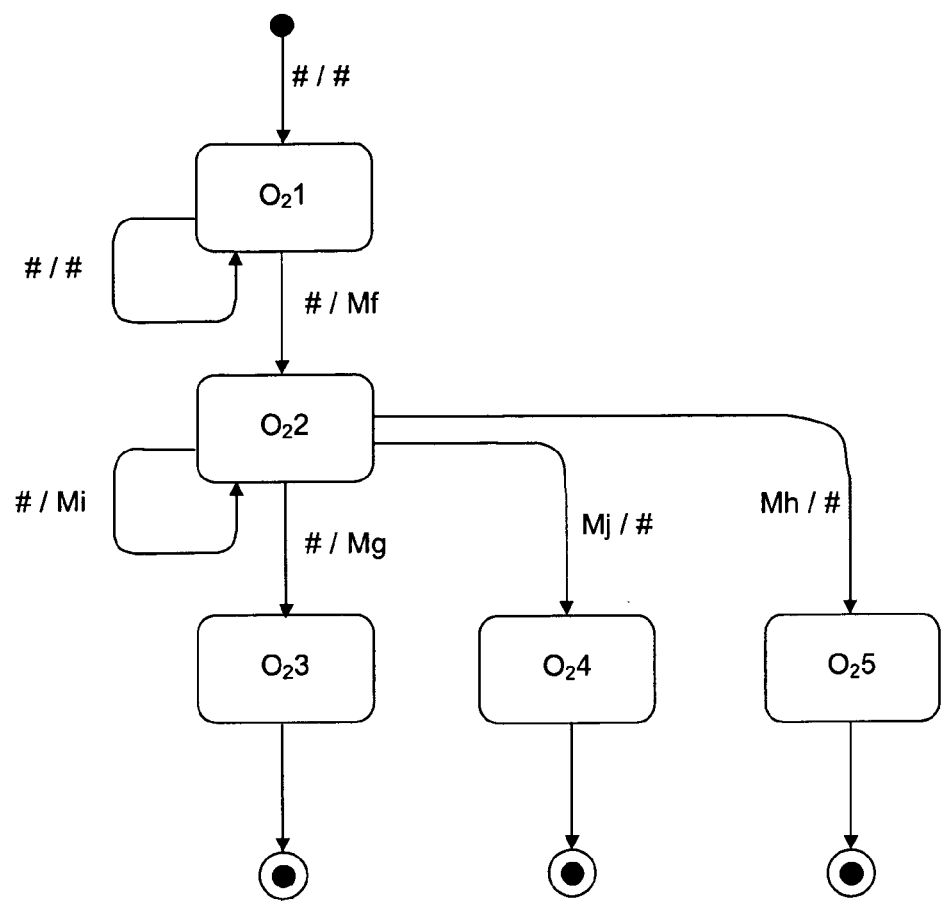

Examples of software objects, which can represent business objects such as a purchase order object or other business-related objects, are given in FIGS. 9 and 10. FIG. 9 shows a schematic state chart diagram for an object $0_1$, and FIG. 10 shows a schematic state chart diagram for another object $O_2$, both objects being part of the same participant system, e.g., 10$_1$ or 10$_2$. Object $O_1$ can assume four different states $O_1 1$, $O_1 2$, $O_1 3$, and $O_1 4$, and object $O_2$ can assume five different states $O_2 1$, $O_2 2$, $O_2 3$, $O_2 4$, and $O_2 5$. Both objects $O_1$, $O_2$ can experience state transitions as indicated by arrows and associated descriptions in FIGS. 9 and 10. Similar to FIG. 3, Ma–Mi refer to various messages and # refers to a local event, which can, e.g., be a transaction. It is possible that a transaction or message triggers state transitions of two or more objects in the same participant system.

Hereinafter, an embodiment of a collaboration checking procedure is described that is adapted to draw on state transition information of multiple objects of each participant system to determine a collaboration state machine model of a process under examination. This embodiment first determines a local state machine for each participant system from the objects' state transition information and then determines the collaboration state machine model based on the local state machines in the manner described above. Main steps of the procedure are illustrated in the flowchart diagram of FIG. 11. First, in a step 300, processor 130, under control of the CPP embodying the procedure according to this embodiment, retrieves the objects' state transition information from a storage location DB4 where it has been stored by the designer(s) of the process. Similarly to storage location DB1, storage location DB4 can be within memory 140 of computer workstation 110, or on any other computer workstation 111, 112 . . . connected to computer system 100, or even on a network server of network 120. The storage location DB4 can be a shared resource giving all process developers access to the data in the storage location DB4. The objects' state transition information stored in storage location DB4 indicates for each object, states and state transitions of the respective object along with messages and events that trigger, and result from, that object's state transitions.

In a following step 310, processor 130 identifies initial local states of the participant systems. Each initial local state is a vector comprised of an initial object state of all objects of a respective participant system, with an initial object state being one that has no predecessor, i.e., no inbound state transition from another object state. In one embodiment, only one initial local state per participant system may be allowed. In an alternate embodiment, more than one initial local state may be allowed for each participant system.

For example, in the state chart diagrams of objects $O_1$ and $O_2$ shown in FIGS. 9 and 10, object state $O_1 1$ of object $O_1$ has no predecessor and is therefore an initial object state for object $O_1$. Likewise, object state $O_2 1$ of object $O_2$ has no predecessor and is therefore an initial object state for object $O_2$. Assuming that objects $O_1$ and $O_2$ are the only objects of a participant system, an initial local state $S_i$ of that participant system would be defined as a vector comprising vector elements $O_1 1$ and $O_2 1$, i.e., $S_i=(O_1 1; O_2 1)$. As all other object states of objects $O_1$ and $O_2$ have predecessors, $O_1 1$ and $O_2 1$ are the only initial object states, and no further initial local state can be identified for the particular participant system.

Having identified at least one initial local state for each participant system, processor 130 determines in an ensuing step 320 subsequent local states for each participant system. This is done by applying object state transitions as specified by the state transition information retrieved from storage location DB4 to the initial local states. Specifically, processor 130 checks for each object state transition if the respective object state transition is possible to occur (applicable) in a respective initial local state by comparing the starting object state of the respective object state transition with the corresponding object's state in the initial local state. If there is identity between the starting object state and the object's state as given by the initial local state, then the particular object state transition is applicable.

Further above, it has already been indicated that a transaction or message may trigger state transitions of two or more objects in the same participant system. This is unlike the virtual global state machine where a local event or message can trigger one global state transition only. In the case of the object state transitions, the same message can be consumed by two or more objects at the same time, causing this multiplicity of objects to concurrently experience a state transition each. The same is true of local triggering events such as a transaction, which can be processed by two or more objects at the same time. Therefore, a new local state that is subsequent to an initial local state is determined by taking a particular triggering event and simultaneously applying to the initial local state all object state transitions that are initiated by this triggering event and are applicable to the initial local state considered. Thereafter, a further triggering event is taken, and all object state transitions that are initiated by this further triggering event are applied, if possible, to the initial local state, thus giving another subsequent local state. This is repeated for all triggering events, which can be messages, transactions, and other local events.

Having determined all subsequent local states to all initial local states, processor 130 proceeds be determining further new local states by applying object state transitions to the local states just found, in the same manner as is done with the initial local states. This is repeated until no new local states are found and a complete local state machine (local state transition graph) is determined for each participant system.

Figure 11:
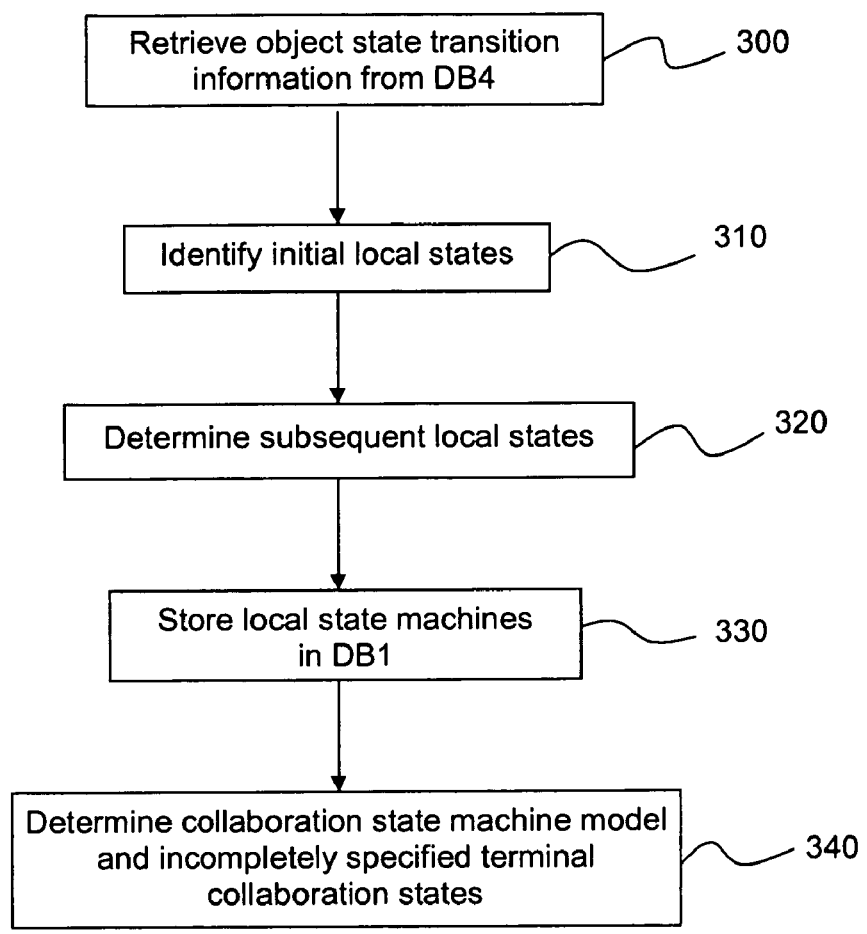
FIG. 11 is a flow chart diagram of steps involved in an alternate embodiment of the collaboration checking procedure.

Having determined the local state machines of all participant systems, processor 130 proceeds by storing these local state machines as local state transition information in storage location DB1 (step 330 in FIG. 11). The local state transition information thus generated and stored serves as input to the next level of analysis where a collaboration state machine model and incompletely specified terminal collaboration states are determined from the local state transition information (step 340 in FIG. 11). To this end, the procedure explained and illustrated in connection with FIGS. 5–8 can be employed.

Further above, an embodiment has been described where the collaboration state machine model of the process under examination is determined from a virtual global state machine by identifying and extracting valid global states from a set of virtual global states of the virtual global state machine. In cases where a number of messages are exchangeable between the participant systems and the latter can assume a number of different local states, the number of virtual global states and global state transitions can be very high, requiring considerable memory space for storing the virtual global state machine. In the following an embodiment is described with reference to the flow chart diagram of FIG. 12 that consumes less memory for generating the collaboration state machine model by ignoring irrelevant global states.

Figure 12:
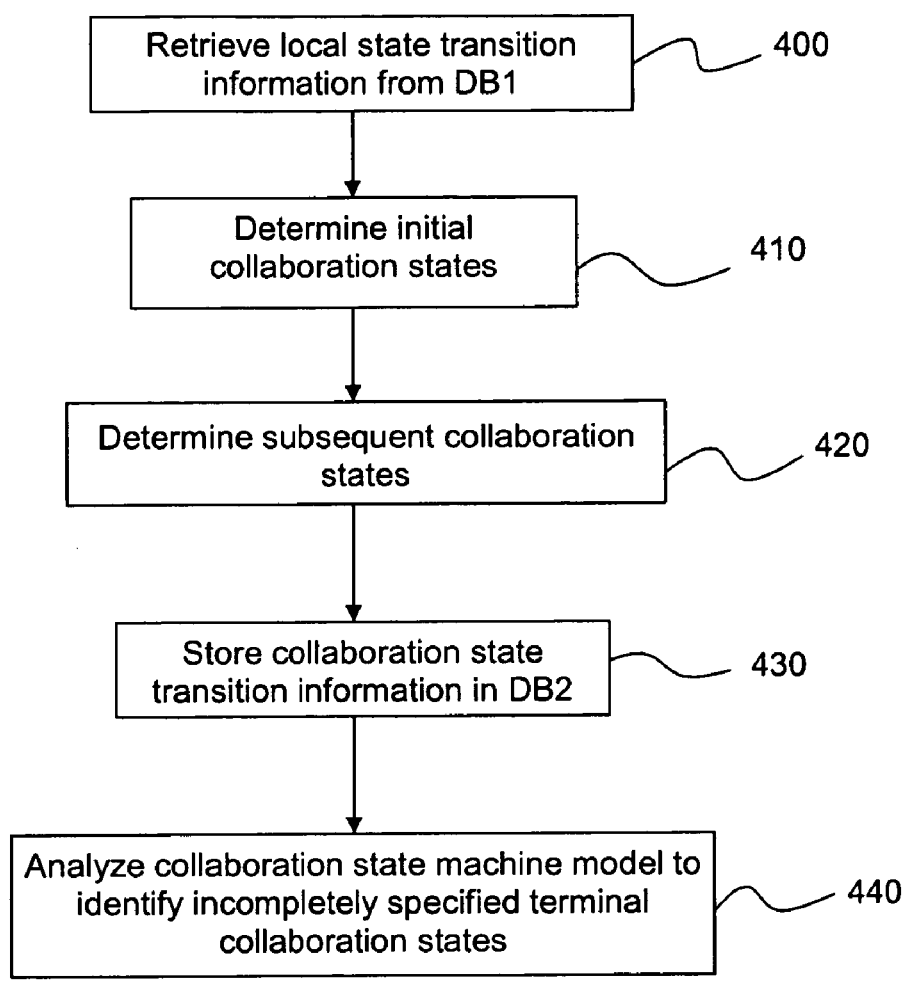
FIG. 12 is a flow chart diagram of steps involved in yet another embodiment of the collaboration checking procedure.

In this embodiment, the collaboration state machine model is generated directly from the local state transition information stored in DB1 without first generating a maximum possible set of virtual global states. Specifically and as illustrated in FIG. 12, processor 130 retrieves the local state transition information from DB1 (step 400) and then determines a list of initial collaboration states from the retrieved local state transition information (step 410). An initial collaboration state is defined by each participant system assuming an initial local state and each message having a non-presence communication status. In other words, an initial collaboration state is a global state in which each participant system is in an initial local state and no messages are underway. An initial local state is a local state that has no predecessor, i.e., no inbound state transition from another local state. There may be allowed a single initial local state for each participant system only. In this case, the list of initial collaboration states will be comprised of a single initial collaboration state. Alternatively, there may be allowed more than one initial local state per participant system. Then, the list of initial collaboration states may contain more than one list member.

In the example process illustrated by the state chart diagram of FIG. 3, S1 is an initial local state of participant system $10_1$ since this local state has no predecessor. On the other hand, local state S2 of participant system $10_1$ is no initial local state as it has an inbound transition from S1. Further, local state S3 is an initial local state of participant system $10_2$: it is the only local state. Therefore, an initial collaboration state of the process specified by the state chart diagram of FIG. 3 is (S1; S3; 0; 0; 0), which corresponds to VGS 15 of the above table of virtual global states. There are no more initial collaboration states.

Having determined every initial collaboration state, processor 130 determines in a following step 420 subsequent collaboration states by applying the local state transitions specified by the information retrieved from DB1 to the initial collaboration state(s). Application of local state transitions to a collaboration state, which is a global state, has already been described in detail hereinabove. A further explanation is therefore omitted. New or subsequent collaboration states are determined by applying the local state transitions to every initial collaboration state. These subsequent collaboration states are in turn subjected to application of the local state transitions to determine further collaboration states. This is reiterated until no further collaboration states are found and the complete collaboration state transition graph is determined. Processor 130 then stores the collaboration state transition information thus generated in storage location DB2 (step 430 in FIG. 12) and continues with an analysis of the collaboration state transition graph to identify any incompletely specified terminal collaboration states (step 440).

Referring again to the example process specified by the state chart diagram of FIG. 3, a person skilled in the art will be readily able to verify that starting from VGS 15 as an initial collaboration state all other collaboration states of the collaboration state machine model of FIG. 7, i.e., VGS 2, 3, 4, 5, 6, 7, and 14, can be obtained using the above-described technique.

While the invention has been described with reference to preferred embodiments, those skilled in the art will readily appreciate that various changes may be made thereto without departing from the scope of the invention. The invention is therefore intended to include all embodiments that are within the scope of the appended claims.

The invention claimed is:

1. A computer-implemented method to support in developing a process specification for a collaborative process involving distributed computer-based participant systems exchanging messages through an asynchronous messaging network, the method embodied by a computer program product executable by a computer system and causing, when executed, said computer system to carry out the steps of:

retrieving from a first storage location, sub-system state information on sub-system states and sub-system state transitions in relation to a plurality of software sub-systems of each participant system, said sub-system state information specifying in relation to each sub-system state transition, starting and target sub-system states of the corresponding software sub-system and events triggering, and resulting from, the respective sub-system state transition;

processing said retrieved sub-system state information to generate, and store in a second storage location, collaboration state information on collaboration states and collaboration state transitions of said process, said collaboration states being defined by a sub-system state for each software sub-system of each participant system and a communication status of each message exchangeable between said participant systems, said collaboration state transitions being determined based on said sub-system state transitions;

upon generation and storage of said collaboration state information, retrieving said collaboration state information from said second storage location;

processing said retrieved collaboration state information to generate information on incompletely specified terminal collaboration states among said collaboration states, an incompletely specified terminal collaboration state being a terminal collaboration state in which at least one message is underway between said participant systems; and generating a result data object containing information on every incompletely specified terminal collaboration state found.

2. The method of claim 1, wherein said step of processing said sub-system state information includes the steps of:

processing said sub-system state information to generate, and store in a third storage location, local state information on local states and local state transitions of each participant system, said local state information specifying in relation to each local state transition, starting and target local states of the corresponding participant system and events triggering, and resulting from, the respective local state transition, said local states being defined by a sub-system state for each software sub-system of the respective participant system, said local state transitions being defined by applying said sub-system state transitions to said local states;

upon generation and storage of said local state information, retrieving said local state information from said third storage location; and processing said retrieved local state information to generate said collaboration state information, said collaboration state transitions being determined by applying said local state transitions to said collaboration states.

3. The method of claim 2, wherein said step of processing said sub-system state information includes the steps of:

identifying an initial sub-system state from said sub-system states of each software sub-system; and generating said local state information by determining an initial local state for each participant system from said initial sub-system states of said software sub-system of the respective participant system, determining subsequent local states by applying said sub-system state transitions to said initial local states, and reiterating applying said sub-system state transitions to local states identified in a previous iteration until no further local states are found.

4. The method of claim 2 or 3, wherein said step of processing said retrieved local state information includes generating, and storing in said second storage location, information on a set of virtual global states, said virtual global states being defined each by a local state for each participant system and a communication status of each message, said set of virtual global states comprising states of any combination of local states of said participant systems and communication statuses of said messages.

5. The method of claim 4, wherein said virtual global states are represented each by a global state vector composed of first global state vector elements indicating a local state for each participant system and one or more second global state vector elements, one in relation to each message, each second global state vector element indicating a communication status of the respective message, said set of virtual global states comprising states of any combination of values of said first and second global state vector elements.

6. The method of claim 4 or 5, wherein said step of processing said retrieved local state information includes identifying an initial global state among said virtual global states, said initial global state being one in which at least one local state transition as specified by said local state information and involving a local trigger is applicable to said initial global state and no message is underway between said participant systems, said local state transition causing a global state transition from said initial global state to another virtual global state; determining every virtual global state reachable when starting from said initial global state; and determining said initial global state and every virtual global state reachable from said initial global state to be collaboration states.

7. The method of claim 3, wherein said step of processing said local state information includes the step of generating said collaboration state information by:

determining an initial collaboration state, said initial collaboration state being defined by an initial local state for each participant system and a non-presence communication status of each message;

determining subsequent collaboration states by applying said local state transitions to said initial collaboration state; and reiterating applying said local state transitions to collaboration states identified in a previous iteration until no further collaboration states are found.

8. A computer-implemented method to support in developing a process specification for a collaborative process involving distributed computer-based participant systems exchanging messages through an asynchronous messaging network, the method embodied by a computer program product executable by a computer system and causing, when executed, said computer system to carry out the steps of:

retrieving from a third storage location, local state information on local states and local state transitions in relation to each participant system, said local state information specifying in relation to each local state transition, starting and target local states of the corresponding participant system and events triggering, and resulting from, the respective local state transition;

processing said retrieved local state information to generate, and store in a second storage location, information on collaboration states and collaboration state transitions of said process, said collaboration states defined by a local state for each participant system and a communication status of each message exchangeable between said participant systems, said step of processing said local state information including the steps of identifying an initial local state from said local states of each participant system and generating said collaboration state information by:

determining an initial collaboration state, said initial collaboration state being defined by said initial local state of each participant system and a non-presence communication status of each message;

determining subsequent collaboration states by applying said local state transitions to said initial collaboration state; and reiterating applying said local state transitions to collaboration states identified in a previous iteration until no further collaboration states are found;

upon generation and storage of said collaboration state information, retrieving said collaboration state information from said second storage location;

processing said retrieved collaboration state information to generate information on incompletely specified terminal collaboration states among said collaboration states, an incompletely specified terminal collaboration state being a terminal collaboration state in which at least one message is underway between said participant systems; and generating a result data object containing information on every incompletely specified terminal collaboration state found.

9. The method of any of claims 1 to 8, further comprising the step of storing said result data object in a fourth storage location.

10. The method of any of claims 1 to 9, further comprising the step of providing said result data object to a graphical output device to visually present on a display a presentation object indicating every incompletely specified terminal collaboration state found.

11. The method of any of claims 1 to 10, wherein said communication status is a binary status indicating whether or not the respective message is underway between said participant systems.

12. A computer system to support in developing a process specification for a collaborative process involving distributed computer-based participant systems exchanging messages through an asynchronous messaging network, said computer system provided with a computer program product that, when executed, causes said computer system to carry out the steps of:
   retrieving from a first storage location, sub-system state information on sub-system states and sub-system state transitions in relation to a plurality of software sub-systems of each participant system, said sub-system state information specifying in relation to each sub-system state transition, starting and target sub-system states of the corresponding software sub-system and events triggering, and resulting from, the respective sub-system state transition;
   processing said retrieved sub-system state information to generate, and store in a second storage location, collaboration state information on collaboration states and collaboration state transitions of said process, said collaboration states being defined by a sub-system state for each software sub-system of each participant system and a communication status of each message exchangeable between said participant systems, said collaboration state transitions being determined based on said sub-system state transitions;
   upon generation and storage of said collaboration state information, retrieving said collaboration state information from said second storage location;
   processing said retrieved collaboration state information to generate information on incompletely specified terminal collaboration states among said collaboration states, an incompletely specified terminal collaboration state being a terminal collaboration state in which at least one message is underway between said participant systems; and
   generating a result data object containing information on every incompletely specified terminal collaboration state found.

13. A computer system to support in developing a process specification for a collaborative process involving distributed computer-based participant systems exchanging messages through an asynchronous messaging network, said computer system provided with a computer program product that, when executed, causes said computer system to carry out the steps of:
   retrieving from a third storage location, local state information on local states and local state transitions in relation to each participant system, said local state information specifying in relation to each local state transition, starting and target local states of the corresponding participant system and events triggering, and resulting from, the respective local state transition;
   processing said retrieved local state information to generate, and store in a second storage location, information on collaboration states and collaboration state transitions of said process, said collaboration states defined by a local state for each participant system and a communication status of each message exchangeable between said participant systems, said step of processing said local state information including the steps of identifying an initial local state from said local states of each participant system and generating said collaboration state information by:
      determining an initial collaboration state, said initial collaboration state being defined by said initial local state of each participant system and a non-presence communication status of each message;
      determining subsequent collaboration states by applying said local state transitions to said initial collaboration state; and
      reiterating applying said local state transitions to collaboration states identified in a previous iteration until no further collaboration states are found;
   upon generation and storage of said collaboration state information, retrieving said collaboration state information from said second storage location;
   processing said retrieved collaboration state information to generate information on incompletely specified terminal collaboration states among said collaboration states, an incompletely specified terminal collaboration state being a terminal collaboration state in which at least one message is underway between said participant systems; and
   generating a result data object containing information on every incompletely specified terminal collaboration state found.

* * * * *